(12) United States Patent
Sakamoto et al.

(10) Patent No.: US 10,308,166 B2
(45) Date of Patent: Jun. 4, 2019

(54) VEHICLE

(71) Applicant: Kawasaki Jukogyo Kabushiki Kaisha, Kobe-shi, Hyogo (JP)

(72) Inventors: Takuya Sakamoto, Akashi (JP); Taro Iwamoto, Kakogawa (JP); Osamu Tani, Kobe (JP)

(73) Assignee: KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 83 days.

(21) Appl. No.: 15/390,342

(22) Filed: Dec. 23, 2016

(65) Prior Publication Data
US 2017/0182930 A1    Jun. 29, 2017

(30) Foreign Application Priority Data

Dec. 28, 2015 (JP) ................................. 2015-256647

(51) Int. Cl.
*B60R 22/00* (2006.01)
*E05F 15/00* (2015.01)
(Continued)

(52) U.S. Cl.
CPC ............. *B60Q 1/10* (2013.01); *B60Q 1/0408* (2013.01); *B60Q 1/18* (2013.01); *B62J 6/02* (2013.01);
(Continued)

(58) Field of Classification Search
CPC .......... B60Q 1/0408; B60Q 1/10; B60Q 1/18; B60Q 2300/134; B62J 6/02; B62K 2207/02
(Continued)

(56) References Cited

U.S. PATENT DOCUMENTS 4,024,388 A * 5/1977 Skoff .......................... B62J 6/00
362/467
5,975,732 A * 11/1999 Tabata ..................... B60Q 1/12
362/475

(Continued)

FOREIGN PATENT DOCUMENTS

| EP | 2657078 A2 | 10/2013 |
|----|------------|---------|
| EP | 2792584 A1 | 10/2014 |
| EP | 2792585 A1 | 10/2014 |
| JP | 2013248988 A | 12/2013 |

OTHER PUBLICATIONS

European Patent Office, Extended European Search Report Issued in Application No. 16204407.7, dated May 4, 2017, Germany, 7 pages.

*Primary Examiner* — Harry Y Oh
(74) *Attorney, Agent, or Firm* — Alleman Hall Creasman & Tuttle LLP

(57) ABSTRACT

A vehicle comprises a head lamp which irradiates a head lamp irradiation region set in front of a vehicle body; an auxiliary lamp which irradiates an auxiliary lamp irradiation region set in front of the head lamp irradiation region; a bank state detecting section which detects a bank state of the vehicle body; and a lighting control section which lights the auxiliary lamp depending on the bank state, the lighting control section causes the auxiliary lamp to be lighted in a set lighting state when the bank state detecting section detects a predetermined set bank state, and the lighting control section causes the auxiliary lamp to be lighted in a preceding lighting state at luminosity lower than that of the set lighting state, when the bank state detecting section detects a preceding bank state which occurs before the vehicle body reaches the set bank state.

8 Claims, 10 Drawing Sheets

(51) Int. Cl.
*G05D 1/00* (2006.01)
*G05D 3/00* (2006.01)
*G06F 7/00* (2006.01)
*G06F 17/00* (2019.01)
*B60Q 1/10* (2006.01)
*B60Q 1/04* (2006.01)
*B60Q 1/18* (2006.01)
*B62J 6/02* (2006.01)

(52) U.S. Cl.
CPC .... *B60Q 2300/134* (2013.01); *B62K 2207/02* (2013.01)

(58) Field of Classification Search
USPC .......................................................... 701/49
See application file for complete search history.

(56) References Cited

U.S. PATENT DOCUMENTS

| | | | | |
|---|---|---|---|---|
| 8,398,277 | B2* | 3/2013 | Fritz | B60Q 1/12 362/464 |
| 8,550,673 | B1* | 10/2013 | Jones, Jr. | B60Q 1/12 362/464 |
| 2008/0225535 | A1 | 9/2008 | Mochizuki | |
| 2013/0241412 | A1* | 9/2013 | Ooba | B60Q 1/12 315/82 |
| 2013/0241413 | A1* | 9/2013 | Ooba | B60Q 1/0041 315/82 |
| 2013/0241414 | A1* | 9/2013 | Ikeda | B60Q 1/12 315/82 |
| 2014/0136076 | A1* | 5/2014 | Novak | B62J 17/04 701/102 |
| 2017/0283588 | A1* | 10/2017 | Frissen | H05K 1/0353 |

* cited by examiner

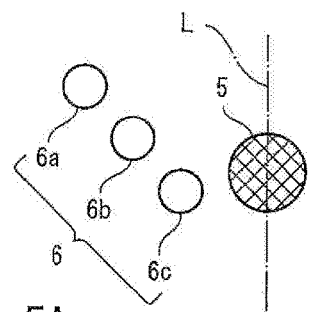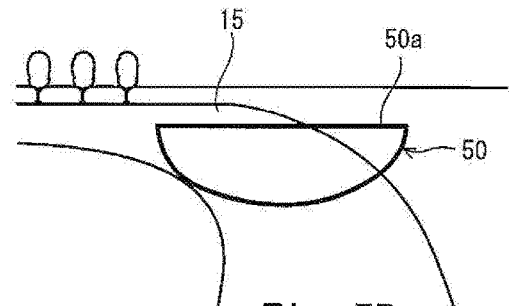
Fig. 5A  Fig. 5B
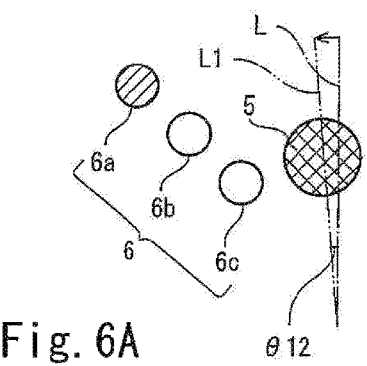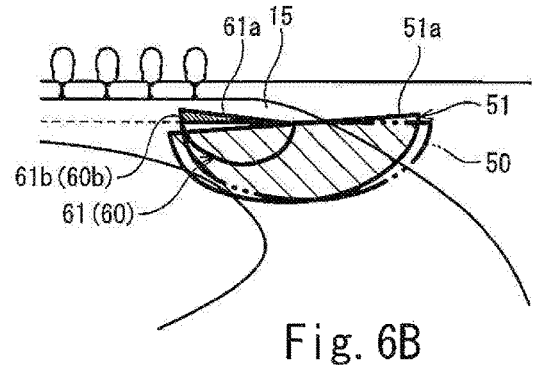
Fig. 6A  Fig. 6B
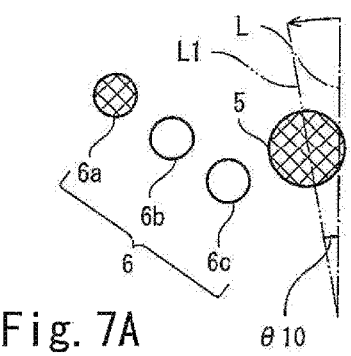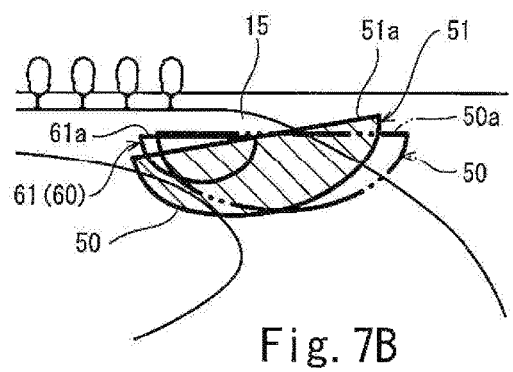
Fig. 7A  Fig. 7B
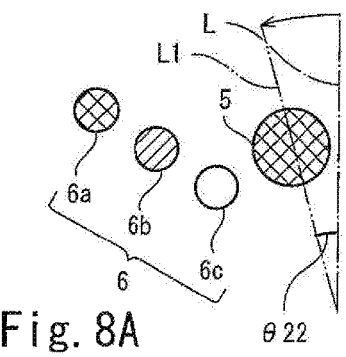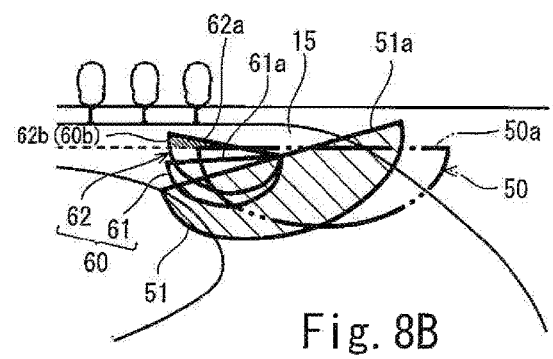
Fig. 8A  Fig. 8B

VEHICLE

CROSS-REFERENCE TO THE RELATED APPLICATION

This application claims priority to and the benefit of Japanese Patent Application No. 2015-256647 filed on Dec. 28, 2015, the entire disclosure of which is incorporated herein by reference.

BACKGROUND OF THE INVENTION

Field of the Invention

The present invention relates to a vehicle which turns in a state in which a vehicle body thereof is banked (tilted) from an upright state to one side in a vehicle width direction.

Description of the Related Art

In some cases, an exemplary vehicle such as a motorcycle turns in a state in which a vehicle body thereof is banked while the vehicle is traveling. For example, in a case where the vehicle turns in a state in which its vehicle body is banked from its upright state to the left, a region to be irradiated by a head lamp is lowered at the left from the perspective of a rider straddling the vehicle body. In other words, it becomes difficult for the head lamp to irradiate a region which is distant in the traveling direction, in a region which is inward with respect to the turning direction of the vehicle body. As a solution to this, a vehicle is known, including an auxiliary lamp which is lighted (turned on) according to the bank angle of the vehicle body, in addition to the head lamp (see e.g., Japanese Laid-Open Patent Application Publication No. 2013-248988).

However, in the auxiliary lamp disclosed in the above patent literature is lighted when the vehicle body is banked at a predetermined bank angle, and a region in the traveling direction (a region to which the vehicle turns) is not irradiated with the light until the auxiliary lamp is lighted. In a case where the vehicle turns and its vehicle body is banked in a state in which the head lamp is on, the auxiliary lamp is lighted abruptly at a predetermined bank angle, in addition to the head lamp. This makes the rider feel discomfort.

In view of the above, an object of the present invention is to reduce discomfort of a rider when an auxiliary lamp is lighted (turned on) while allowing the rider to well see a road surface of a region to which a vehicle turns during traveling, in the vehicle including the auxiliary lamp.

SUMMARY OF THE INVENTION

According to an aspect of the present invention, a vehicle which turns in a state in which a vehicle body is banked (tilted) from an upright state to a first side in a vehicle width direction of the vehicle body, comprises a head lamp which is attached to the vehicle body, and irradiates a head lamp irradiation region set in front of the vehicle body; an auxiliary lamp which is attached to the vehicle body, and irradiates an auxiliary lamp irradiation region set in front of the head lamp irradiation region, on the first side in the vehicle width direction; a bank state detecting section which detects a bank state of the vehicle body; and a lighting control section which lights the auxiliary lamp depending on the bank state of the vehicle body, wherein the lighting control section causes the auxiliary lamp to be lighted in a predetermined set lighting state at predetermined luminosity, when the bank state detecting section detects a predetermined set bank state of the vehicle body, and wherein the lighting control section causes the auxiliary lamp to be lighted in a predetermined preceding lighting state at predetermined luminosity lower than the predetermined luminosity of the predetermined set lighting state, when the bank state detecting section detects a predetermined preceding bank state of the vehicle body which occurs before the vehicle body reaches the predetermined set bank state.

In accordance with this configuration, when the vehicle body is banked to the predetermined preceding bank state with a bank angle smaller than that of the predetermined set bank state, the auxiliary lamp is lighted in the preceding lighting state, and can irradiate the auxiliary lamp irradiation region, in the traveling direction of the vehicle body, before the auxiliary lamp reaches the set lighting state. This allows the rider to well see a region to which the vehicle turns, in the front region in the traveling direction while the vehicle is turning. Since the auxiliary lamp is lighted in the preceding lighting state, before the auxiliary lamp reaches the set lighting state, when the vehicle is banked to the first side in the vehicle width direction, a change in the brightness of the light can be reduced, which prevents the rider from feeling discomfort due to the lighting of the auxiliary lamp. In the preceding bank state of the vehicle body, the auxiliary lamp is lighted in the preceding lighting state at the luminosity lower than that of the set lighting state. This makes it possible to prevent, for example, a situation in which a person riding in a vehicle coming from the opposite direction is bothered by glaring light emitted from the auxiliary lamp. Thus, the auxiliary lamp becomes the preceding lighting state before it reaches the set lighting state. As a result, it becomes possible to prevent the rider from feeling discomfort due to the lighting of the auxiliary lamp, and prevent the situation in which a person riding in a vehicle coming from the opposite direction is bothered by glaring light emitted from the auxiliary lamp, while allowing the rider to well see the road surface of the region to which the vehicle turns.

At least a portion of the auxiliary lamp irradiation region formed in a case where the vehicle body is in the predetermined preceding bank state may be an auxiliary lamp preceding irradiation region located in front of a cut-off line of the head lamp irradiation region of the head lamp in a case where the vehicle body is in the upright state, and the lighting control section may control the luminosity of the light emitted from the auxiliary lamp used to irradiate the auxiliary lamp irradiation region in such a manner that the luminosity is set to be lower when the vehicle body is in the predetermined preceding bank state than when the vehicle body is in the predetermined set bank state.

In accordance with this configuration, since the luminosity of the light emitted from the auxiliary lamp used to irradiate the auxiliary lamp preceding irradiation region after the preceding bank state is detected is controlled to be lower than that of the set bank state. This makes it possible to prevent, for example, a situation in which the person riding in the vehicle coming from the opposite direction is bothered by glaring light emitted from the auxiliary lamp, before the vehicle body reaches the set bank state. Thus, since the auxiliary lamp becomes the preceding lighting state before it reaches the set lighting state, it becomes possible prevent the situation in which the person riding in the vehicle coming from the opposite direction is bothered by glaring light emitted from the auxiliary lamp, while allowing the rider to well see the road surface of the region to which the vehicle turns.

At least a portion of the auxiliary lamp irradiation region formed in a case where the vehicle body is in the predetermined preceding bank state may be located in front of a cut-off line of the head lamp irradiation region of the head lamp in a case where the vehicle body is in the upright state, and the auxiliary lamp irradiation region formed in a case where the vehicle body is in the predetermined set bank state may be located rearward relative to the cut-off line of the head lamp irradiation region of the head lamp in a case where the vehicle body is in the upright state.

In accordance with this configuration, since at least a portion of the auxiliary lamp irradiation region formed when the vehicle body is in the preceding bank state is located in front of the cut-off line of the head lamp irradiation region of the head lamp, the auxiliary lamp is lighted at the predetermined luminosity at earlier time while preventing the situation in which the person riding in a vehicle coming from the opposite direction is bothered by glaring light emitted from the auxiliary lamp. Also, since the auxiliary lamp irradiation region formed when the vehicle body is in the set bank state is located rearward relative to the cut-off line of the head lamp irradiation region of the head lamp, the brightness of the limit emitted from the auxiliary lamp is increased, and the rider can well see the road surface.

The lighting control section may control luminosity of the light emitted from the auxiliary lamp in such a manner that the luminosity is increased as a degree of a bank angle of the vehicle body is increased after the auxiliary lamp has reached the predetermined set lighting state.

In accordance with this configuration, it becomes possible to prevent a rapid change in the luminosity of the light emitted from the auxiliary lamp when the vehicle body has reached the set bank state. As a result, it becomes possible to more effectively prevent the rider from feeling discomfort due to the lighting of the auxiliary lamp.

A degree of a bank angle of the vehicle body in a case where the auxiliary lamp is lighted after the bank state detecting section detects that the vehicle body has reached the predetermined preceding bank state may be larger than a degree of the bank angle in a case where the auxiliary lamp is turned off after the bank state detecting section detects that the vehicle body has exited the predetermined preceding bank state.

In accordance with this configuration, since the auxiliary lamp is lighted and turned off in different bank states of the vehicle body, a hysteresis can be set in the lighting operation of the auxiliary lamp. This makes it possible to prevent a situation in which the auxiliary lamp is lighted and turned off in repetition, at a boundary between the state in which the auxiliary lamp is lighted and the state in which the auxiliary lamp is turned off.

The lighting control section may control luminosity of the light emitted from the auxiliary lamp in such a manner that the luminosity is increased as a degree of a bank angle of the vehicle body is increased after the bank state detecting section detects that the vehicle body has reached the predetermined preceding bank state.

In accordance with this configuration, the luminosity of the light emitted from the auxiliary lamp is controlled to be gradually increased, after the bank state detecting section detects that the vehicle body has reached the preceding bank state. This makes it possible to prevent a rapid change in the brightness of the light just after the first auxiliary lamp is lighted and to more effectively prevent discomfort of the rider.

The predetermined set bank state may include a first set bank state and a second set bank state having a bank angle larger than that of the first set bank state, the predetermined preceding bank state may include a first preceding bank state having a bank angle smaller than that of the first set bank state, and a second preceding bank state having a bank angle smaller than that of the second set bank state, the auxiliary lamp may include a first auxiliary lamp which irradiates a first auxiliary lamp irradiation region set in front of the head lamp irradiation region, and a second auxiliary lamp which irradiates a second auxiliary lamp irradiation region set in front of the first auxiliary lamp irradiation region, the lighting control section may cause the first auxiliary lamp to be lighted in a first set lighting state at predetermined luminosity of the light, when the bank state detecting section detects that the vehicle body has reached the first set bank state, the lighting control section may cause the second auxiliary lamp to be lighted in a second set lighting state at predetermined luminosity of the light, when the bank state detecting section detects that the vehicle body has reached the second set bank state, and the lighting control section may cause the second auxiliary lamp to be lighted in a second preceding lighting state at predetermined luminosity of the light which is lower than that of the second set lighting state, when the bank state detecting section detects the second preceding bank state of the vehicle body after the lighting control section caused the first auxiliary lamp to be lighted in the first set lighting state.

In the vehicle including the plurality of auxiliary lamps, if the auxiliary lamps are lighted only in the set bank states, respectively, in a stepwise manner, seamless lighting of the auxiliary lamps is not realized, and the rider may feel discomfort. In accordance with the above configuration, since the second auxiliary lamp becomes the preceding lighting state between the first set lighting state and the second set lighting state, seamless lighting of the auxiliary lamps can be realized, and the rider do not feel discomfort.

The luminosity of the light emitted from the auxiliary lamp when the vehicle body is in the predetermined preceding bank state may be set to a value which is lower than 1000 cd, to prevent a situation in which a person riding in another vehicle is bothered by glaring light emitted from the auxiliary lamp.

In accordance with this configuration, since the luminosity of the light emitted from the auxiliary lamp when the vehicle body is in the preceding bank state is set to a value which is lower than 1000 cd, it becomes possible to prevent, for example, a situation in which a person riding in the vehicle coming from the opposite direction is bothered by glaring light emitted from the auxiliary lamp.

The luminosity of the light emitted from the auxiliary lamp when the vehicle body is in the predetermined preceding bank state may be set to a value of 300 cd or higher.

In accordance with this configuration, since the luminosity of the light emitted from the auxiliary lamp when the vehicle body is in the preceding bank state is set to a value of 300 cd or higher, the rider can well see the road surface.

According to another aspect of the present invention, a vehicle which turns in a state in which a vehicle body is banked from an upright state to a first side in a vehicle width direction of the vehicle body, comprises a head lamp which is attached to the vehicle body, and irradiates a head lamp irradiation region set in front of the vehicle body; an auxiliary lamp which is attached to the vehicle body, and irradiates an auxiliary lamp irradiation region set in front of the head lamp irradiation region, on the first side in the vehicle width direction; an event detecting section which detects an event which occurs in the vehicle while the vehicle is traveling; and a lighting control section which lights the auxiliary lamp depending on the event of the vehicle, wherein the lighting control section causes the auxiliary lamp to be lighted in a predetermined set lighting state at predetermined luminosity, when the event detecting section detects a predetermined set event of the vehicle, and wherein the lighting control section causes the auxiliary lamp to be lighted in a predetermined preceding lighting state at predetermined luminosity lower than that of the predetermined set lighting state, when the event detecting section detects a preceding event of the vehicle which occurs before the predetermined set event of the vehicle.

In accordance with this configuration, even in a case where some time is taken until the auxiliary lamp reaches the set lighting state, in the vehicle in which the auxiliary lamp is lighted in the set lighting state when the predetermined set event occurs, the auxiliary lamp is caused to be lighted in the preceding lighting state when the preceding event occurs before the predetermined set event. This makes it possible to prevent a situation in which the auxiliary lamp irradiation region to be irradiated by the auxiliary lamp is significantly deviated from a suitable location.

The above and further objects, features and advantages of the present invention will more fully be apparent from the following detailed description of preferred embodiment with reference to the accompanying drawings.

BRIEF DESCRIPTION OF THE DRAWINGS

FIG. 5A is a schematic view showing the lighting states of a head lamp and the auxiliary lamps in a case where a vehicle body is in an upright state.

FIG. 5B is a schematic view showing a head lamp irradiation region of the head lamp of FIG. 5A.

FIG. 6A is a schematic view showing the lighting states of the head lamp and the auxiliary lamps in a case where the vehicle body is in a first preceding bank state.

FIG. 6B is a schematic view showing the head lamp irradiation region of the head lamp and auxiliary lamp irradiation regions of the auxiliary lamps in the lighting states of FIG. 6A.

FIG. 7A is a schematic view showing the lighting states of the head lamp and the auxiliary lamps in a case where the vehicle body is in a first set bank state.

FIG. 7B is a schematic view showing the head lamp irradiation region of the head lamp and the auxiliary lamp irradiation regions of the auxiliary lamps in the lighting states of FIG. 7A.

FIG. 8A is a schematic view showing the lighting states of the head lamp and the auxiliary lamps when the vehicle body is in a second preceding bank state.

FIG. 8B is a schematic view showing the head lamp irradiation region of the head lamp and the auxiliary lamp irradiation regions of the auxiliary lamps in the lighting states of FIG. 8A.

DETAILED DESCRIPTION OF THE EMBODIMENTS

Hereinafter, the embodiments of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction of the vehicle body of the motorcycle corresponds with a rightward and leftward direction.

Embodiment 1

Figure 1:
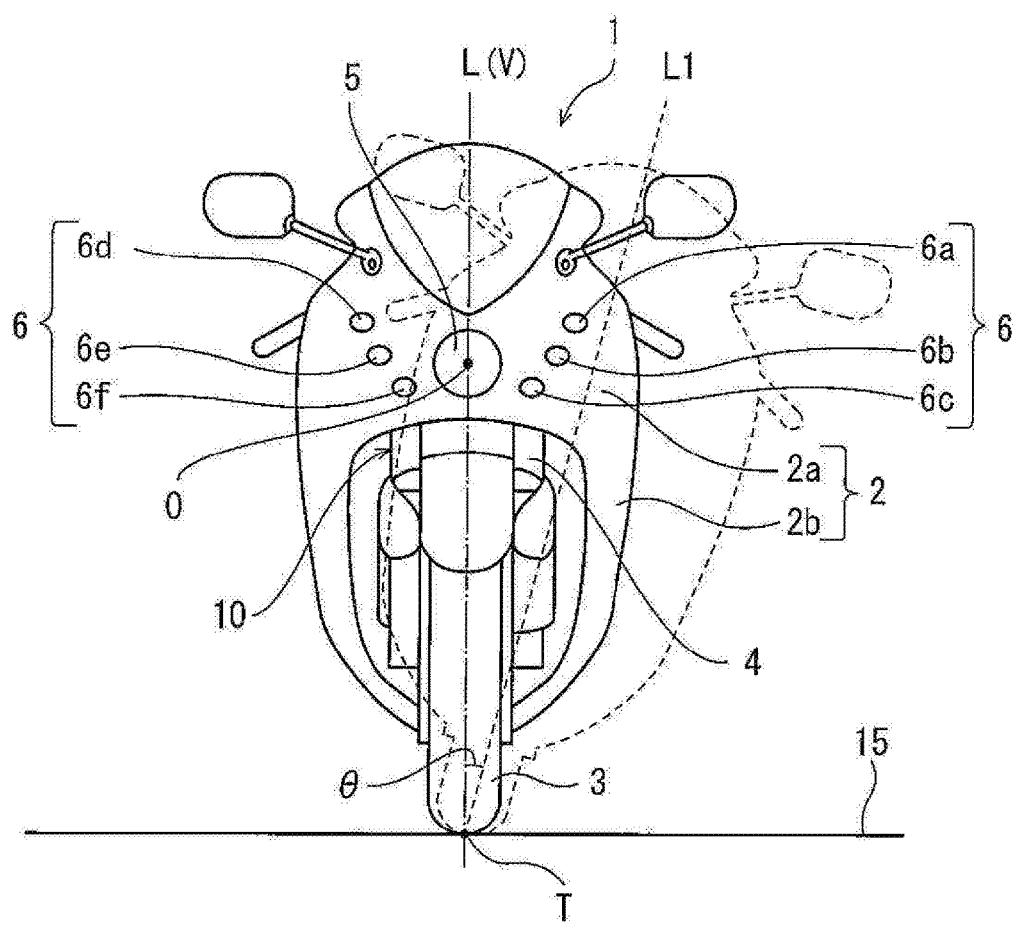
FIG. 1 is a front view of a motorcycle which is an exemplary vehicle according to Embodiment 1.

FIG. 1 is a front view of a motorcycle 1 according to Embodiment 1. As shown in FIG. 1, the motorcycle 1 includes a cowling 2 covering a vehicle body 10. The cowling 2 includes a front cowling 2a, and a side cowling 2b. A front fork 4 is rotatably coupled at a lower end portion thereof to a front wheel 3. The front cowling 2a covers the upper side of the front fork 4. The side cowling 2b is located rearward relative to the front cowling 2a and covers the vehicle body 10 from outer sides in the vehicle width direction. A head lamp 5 is attached to the front portion of the front cowling 2a. In the present embodiment, the head lamp 5 is a head lamp including a light emitting diode (LED) light source as a light source. The light source of the head lamp 5 is not limited to the LED light source, and may be a halogen lamp, a discharge lamp, etc. The head lamp 5 irradiates a head lamp irradiation region 50 set in a road surface 15 which is in front of the vehicle body 10 when the head lamp 5 is lighted (turned on) (see FIG. 7B).

A plurality of auxiliary lamps 6 are attached to the vehicle body 10 on the right and left sides of the head lamp 5 in the vehicle width direction. As in the case of the head lamp 5, each of the plurality of auxiliary lamps 6 includes the LED light source (not shown). As in the case of the head lamp 5, the light source of each of the plurality of auxiliary lamps 6 may be a halogen lamp, a discharge lamp, etc.

More specifically, the plurality of auxiliary lamps 6 include a first auxiliary lamp 6a, a second auxiliary lamp 6b, and a third auxiliary lamp 6c which are disposed on a first side (in the present embodiment, on the left side from the perspective of the rider) in the vehicle width direction relative to the head lamp 5. The plurality of auxiliary lamps 6 further include a first auxiliary lamp 6d, a second auxiliary lamp 6e, and a third auxiliary lamp 6f which are disposed on a second side (in the present embodiment, on the right side from the perspective of the rider) in the vehicle width direction relative to the head lamp 5. The plurality of auxiliary lamps 6a to 6f have the same structure. The number of the auxiliary lamps 6 disposed on the first side in the vehicle width direction relative to the head lamp 5 is not limited to three, and is preferably two or more. The auxiliary lamps 6d to 6f, and the auxiliary lamps 6a to 6c are disposed to be symmetric in the rightward and leftward direction, with respect to a center line L of the vehicle body 10, extending in a direction perpendicular to the vehicle width direction, at a center of the vehicle body 10 in the vehicle width direction. Alternatively, the auxiliary lamps 6d to 6f, and the auxiliary lamps 6a to 6c may not be disposed to be symmetric in the rightward and leftward direction, with respect to the center line L.

The first auxiliary lamps 6a, 6d are upper auxiliary lamps, respectively. The second auxiliary lamps 6b, 6e are intermediate auxiliary lamps located below the first auxiliary lamps 6a, 6d, respectively. The third auxiliary lamps 6c, 6f are lower auxiliary lamps located below the second auxiliary lamps 6b, 6e, respectively. The layout of the first auxiliary lamps 6a, 6d, the second auxiliary lamps 6b, 6e, and the third auxiliary lamps 6c, 6f, shown in FIG. 1 is merely exemplary. Also, hereinafter, in a case where it is not necessary to distinguish the first auxiliary lamps 6a, 6d, the second auxiliary lamps 6b, 6e, and the third auxiliary lamps 6c, 6f from each other, these will be referred to as the auxiliary lamps 6.

The lighting operations of the auxiliary lamps 6 are controlled depending on an event occurring in the motorcycle 1 while the motorcycle 1 is traveling. In the present embodiment, the lighting operations of the auxiliary lamps 6 are controlled according to the bank (tilting) state of the vehicle body 10. The phrase "the lighting operations of the auxiliary lamps 6 are controlled" means "a lighting control section 8b which will be described later controls the brightness of the light emitted from the auxiliary lamps 6 in the lighting states" as well as "the lighting control section 8b turns ON or OFF the auxiliary lamps 6." When the vehicle body 10 is banked (tilted) to the first side in the vehicle width direction, the auxiliary lamps 6 irradiate auxiliary lamp irradiation regions 60 (see FIGS. 6B, 7B, 8B) set in regions of the road surface 15 which are in front of the head lamp irradiation region 50.

The size of each of the auxiliary lamp irradiation regions 60 is set to be smaller than that of the head lamp irradiation region 50. In the present specification, the brightness of the light emitted from the auxiliary lamps 6 which irradiate the auxiliary lamp irradiation regions 60 is indicated by luminosity (luminous intensity) (cd, candela). Alternatively, the brightness of the light emitted from the auxiliary lamps 6 may be indicated by illuminance (lx, lux), flux of light (lm, lumen), or the like. Each of the auxiliary lamp irradiation regions 60 includes a maximum luminosity region (not shown) having luminosity which is 95% or higher and 100% or lower, of maximum luminosity in a light distribution of the auxiliary lamp irradiation region 60. The luminosity of the light emitted from each of the auxiliary lamps 6 is preferably set to a value which is equal to or higher than 300 cd. Specifically, the luminosity of the light with which the maximum luminosity region of the auxiliary lamp irradiation region 60 is irradiated is set to a value that is 300 cd or more, and less than the maximum luminosity of the light emitted from the head lamp 5.

Now, description will be given of the control for the lighting operations of the auxiliary lamps 6a to 6c in a case where the vehicle body 10 is banked to the first side (in the present embodiment, to the left side from the perspective of the rider) in the vehicle width direction.

In the present embodiment, the auxiliary lamps 6d to 6f, and the auxiliary lamps 6a to 6c are disposed to be symmetric in the rightward and leftward direction, with respect to the center line L, and the lighting operations of the auxiliary lamps 6d to 6f are the same as those of the auxiliary lamps 6a to 6c. Therefore, the lighting operations of the auxiliary lamps 6d to 6f will not be described specifically.

Figure 2:
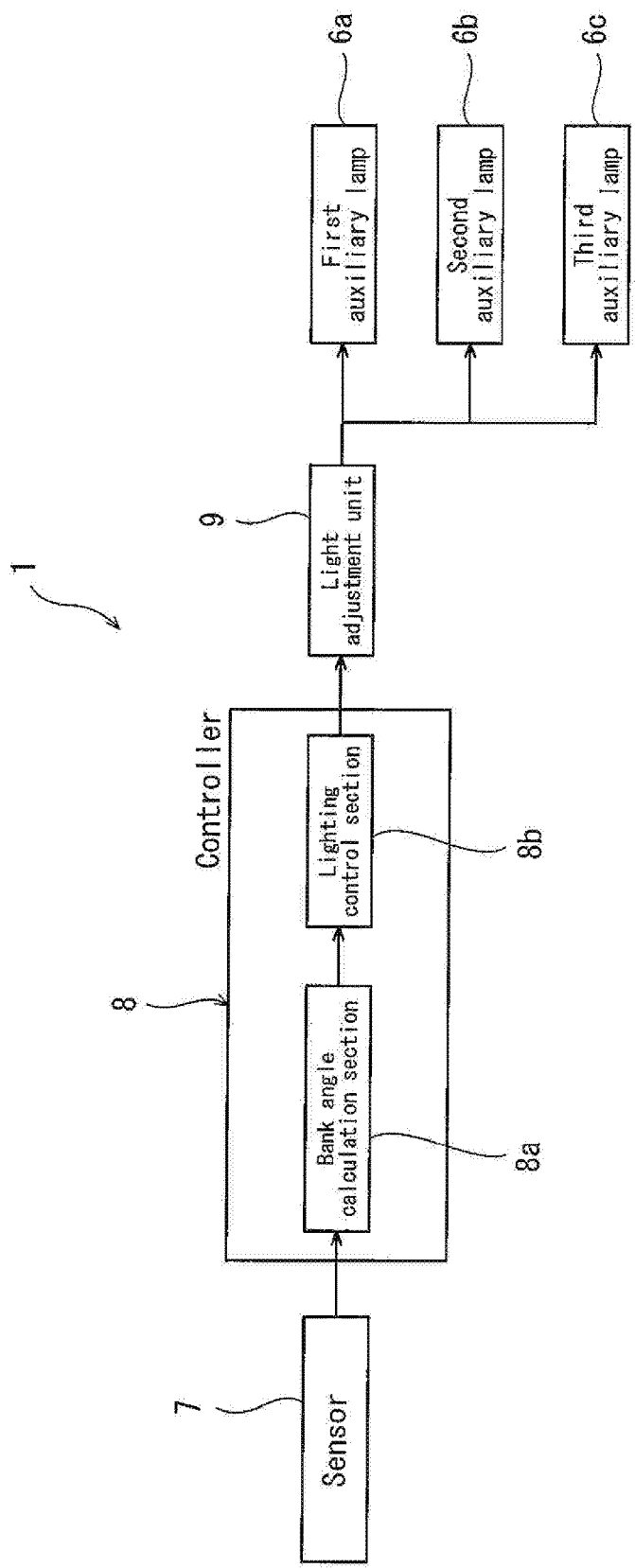
FIG. 2 is a block diagram showing a configuration for controlling lighting operations of auxiliary lamps of FIG. 1.

FIG. 2 is a block diagram showing a configuration for controlling the lighting operations of the auxiliary lamps 6a to 6c of FIG. 1. As shown in FIG. 2, the motorcycle 1 further includes a sensor 7, a controller 8, and a light adjustment unit 9. The sensor 7 is a bank (tilting) state detecting section (event detecting section) which detects the bank state of the vehicle body 10. Specifically, the sensor 7 detects a bank angular velocity around an axis (roll axis) of the vehicle body 10 extending in a forward and rearward direction, as the bank state of the vehicle body 10. The sensor 7 is, for example, a gyro sensor. The sensor 7 is electrically connected to the controller 8. Alternatively, the sensor 7 may be included in the controller 8.

The controller 8 includes a bank angle calculation section 8a and the lighting control section 8b. The bank angle calculation section 8a integrates the bank angular velocity output from the sensor 7 to calculate a bank angle θ (see FIG. 1). The bank angle θ is formed between a vertical line V extending vertically from a contact point T of the front wheel 3 and the road surface 15, and the center line L of the vehicle body 10, extending in the direction perpendicular to the vehicle width direction, at the center of the vehicle body 10 in the vehicle width direction. The value of the calculated bank angle θ is input to the lighting control section 8b.

The lighting control section 8b outputs to the light adjustment unit 9 a control signal used to control the lighting operation of each of the auxiliary lamps 6 based on the value of the bank angle θ. The light adjustment unit 9 adjusts the luminosity of the light emitted from each of the auxiliary lamps 6 in accordance with the control signal output from the lighting control section 8b. Specifically, the light adjustment unit 9 adjusts the luminosity by controlling a current to be supplied to each of the auxiliary lamps 6. Alternatively, the light adjustment unit 9 may adjust the luminosity by changing a duty ratio (ON/OFF cycle) with respect to each of the auxiliary lamps 6. Further, the light adjustment unit 9 may be included in the controller 8 or each of the auxiliary lamps 6.

Figure 3:
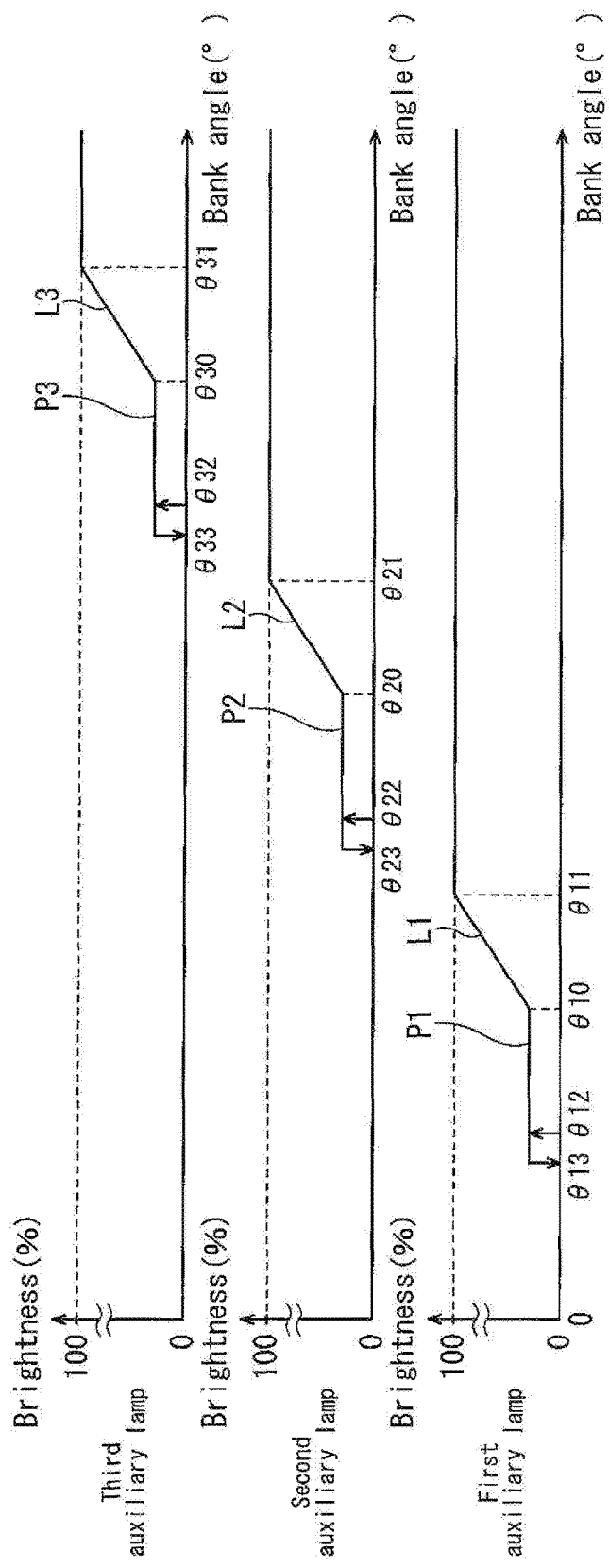
FIG. 3 is a schematic view showing an exemplary relationship between bank angles of a vehicle body and brightness of light of the auxiliary lamps.

FIG. 3 is a view schematically showing an exemplary relationship between the bank angles of the vehicle body 10 and the brightness (luminosity) of the light emitted from the auxiliary lamps 6. In FIG. 3, a horizontal axis indicates the bank angle. The bank angle 0 degree indicates that the vehicle body 10 is in an upright state. A vertical axis indicates a ratio (percentage) of the luminosity of the light emitted from each of the auxiliary lamps 6 in a state in which the vehicle body 10 is banked at a specified bank angle with respect to the maximum luminosity of the light emitted from the auxiliary lamp 6. The lighting state of each of the auxiliary lamps 6 includes a set lighting state and a preceding lighting state which are different in luminosity from each other according to the value of the bank angle. The set lighting state is defined as a state in which each of the auxiliary lamps 6a to 6c is lighted at predetermined luminosity, when a predetermined set bank state (set event) of the vehicle body 10 is detected. The set bank state is defined as a state in which the vehicle body 10 is banked to an extent that a set bank angle is calculated.

The set bank angle is a reference bank angle at which each of the auxiliary lamps 6 is in the set lighting state. The set bank angle is defined for each of the auxiliary lamps 6a to 6c. The set bank angles include a first set bank angle θ10, a second set bank angle θ20, and a third set bank angle θ30. The value of the second set bank angle θ20 is set to be larger than the value of the first set bank angle θ10. The value of the third set bank angle θ30 is set to be larger than the value of the second set bank angle θ20. In the present embodiment, for example, the first set bank angle θ10 is 10 degrees, the second set bank angle θ20 is 20 degrees, and the third set bank angle θ30 is 30 degrees. Each of the auxiliary lamps 6a to 6c is attached to the vehicle body 10 in a state in which each of the auxiliary lamps 6 is tilted with respect to a horizontal plane according to the corresponding set bank angle.

Now, regarding the set lighting state of the present embodiment, a first set lighting state L1 of the first auxiliary lamp 6a will be exemplarily described. When the vehicle body 10 is banked to an extent that the first set bank angle θ10 is calculated, the lighting operation of the first auxiliary lamp 6a shifts from a first preceding lighting state P1 which will be described later, to the first set lighting state L1. After that, when the vehicle body 10 is banked at a lighting completion bank angle θ11, the brightness of the light emitted from the first auxiliary lamp 6a becomes 100%.

The lighting completion bank angle is defined as a bank angle at a time point when the luminosity of the light emitted from each of the auxiliary lamps 6 changes from a value less than the maximum luminosity in the set lighting state and reaches the maximum luminosity. The first auxiliary lamp 6a is lighted at the maximum luminosity when the vehicle body 10 is banked at the first lighting completion bank angle θ11. In the present embodiment, for example, the first lighting completion bank angle θ11 is 13 degrees. While the bank angle is in a range of 10 to 13 degrees, the brightness of the light is gradually increased in proportion to the bank angle. It should be noted that a change rate of the brightness (luminosity) of the light of the first auxiliary lamp 6a with respect to the bank angle may be changed. In the present embodiment, for example, a second lighting completion bank angle θ21 is 23 degrees, and a third lighting completion bank angle θ31 is 33 degrees. At the bank angle larger than the lighting completion bank angle, each of the auxiliary lamps 6 continues to be lighted at the maximum luminosity.

The preceding lighting state is defined as a state in which each of the auxiliary lamps 6a to 6c is lighted at luminosity lower than that of the set lighting state, when the preceding bank state (preceding event) which occurs before the vehicle body 10 reaches the set bank state is detected. The preceding bank state is defined as a state in which the vehicle body 10 is banked to an extent that a preceding bank angle smaller than the set bank angle is calculated. The preceding bank angle is a reference bank angle at which each of the auxiliary lamps 6 is in the preceding lighting state. As in the case of the set bank angle, the preceding bank angle is defined for each of the auxiliary lamps 6a to 6c. In the present embodiment, the preceding bank angles include a first preceding bank angle θ12, a second preceding bank angle θ22, and a third preceding bank angle θ32. In the present embodiment, for example, the first preceding bank angle θ12 is 6 degrees, the second preceding bank angle θ22 is 16 degrees, and the third preceding bank angle θ32 is 26 degrees. Among the auxiliary lamps 6, the first auxiliary lamp 6a is lighted (turned on) first. To prevent, for example, a situation in which a person riding in a vehicle coming from the opposite direction is bothered by glaring light emitted from the first auxiliary lamp 6a, the value of the first preceding bank angle θ12 is preferably set to 5 degrees or larger.

Further, when a bank state which has exited the preceding bank state (hereinafter this will be referred to as a lighting-off bank state) is detected, each of the auxiliary lamps 6a to 6c is turned off. The lighting-off bank state is defined as a state in which the vehicle body 10 is banked to an extent that a lighting-off bank angle is calculated. The lighting-off bank angle is a reference bank angle at which each of the auxiliary lamps 6 is turned off. The lighting-off bank angle is also defined for each of the auxiliary lamps 6a to 6c. In the present embodiment, the lighting-off bank angles include a first lighting-off bank angle θ13, a second lighting-off bank angle θ23, and a third lighting-off bank angle θ33. In the present embodiment, for example, the first lighting-off bank angle θ13 is 5 degrees, the second lighting-off bank angle θ23 is 15 degrees, and the third lighting-off bank angle θ33 is 25 degrees. In this way, the preceding bank angles are set to be larger than the lighting-off bank angles, respectively. Specifically, a degree of the bank angle in a case where the first auxiliary lamp 6a is lighted (turned on) after the bank state detecting section detects that the bank state has reached the preceding bank state is larger than that in a case where the first auxiliary lamp 6a is turned off after the bank state detecting section detects that the bank state has exited the preceding bank state.

Now, regarding the preceding lighting state of the present embodiment, the first preceding lighting state P1 of the first auxiliary lamp 6a will be exemplarily described. In the first preceding lighting state P1, when the vehicle body 10 is banked to an extent that the first preceding bank angle θ12 is calculated, the first auxiliary lamp 6a is lighted (turned on). To prevent, for example, the situation in which the person riding in the vehicle coming from the opposite direction is bothered by the glaring light emitted from the first auxiliary lamp 6a, the luminosity of the light emitted from the first auxiliary lamp 6a in the first preceding lighting state P1 is set to a value less than 1000 cd. The first auxiliary lamp 6a is preferably lighted at highest possible luminosity under this set condition. Also, the luminosity of the light emitted from the first auxiliary lamp 6a is set to secure that the light emitted to the road surface 15 can be well recognized by the rider.

For a time period from when the first auxiliary lamp 6a is lighted (turned on) at the first preceding bank angle θ12 until the first set bank angle θ10 is calculated, namely, the vehicle body 10 reaches the first set bank state L1, the luminosity of the light emitted from the first auxiliary lamp 6a is constant. In the first preceding lighting state P1, when the vehicle body 10 is banked to an extent that the first lighting-off bank angle θ13 is calculated, the first auxiliary lamp 6a is turned off. In this way, in the first preceding lighting state P1, the auxiliary lamp 6 is lighted at the constant luminosity, and therefore, it is not necessary to perform a control for changing the luminosity of the light emitted from the auxiliary lamp 6 in proportion to the degree of the bank angle.

Figure 4:
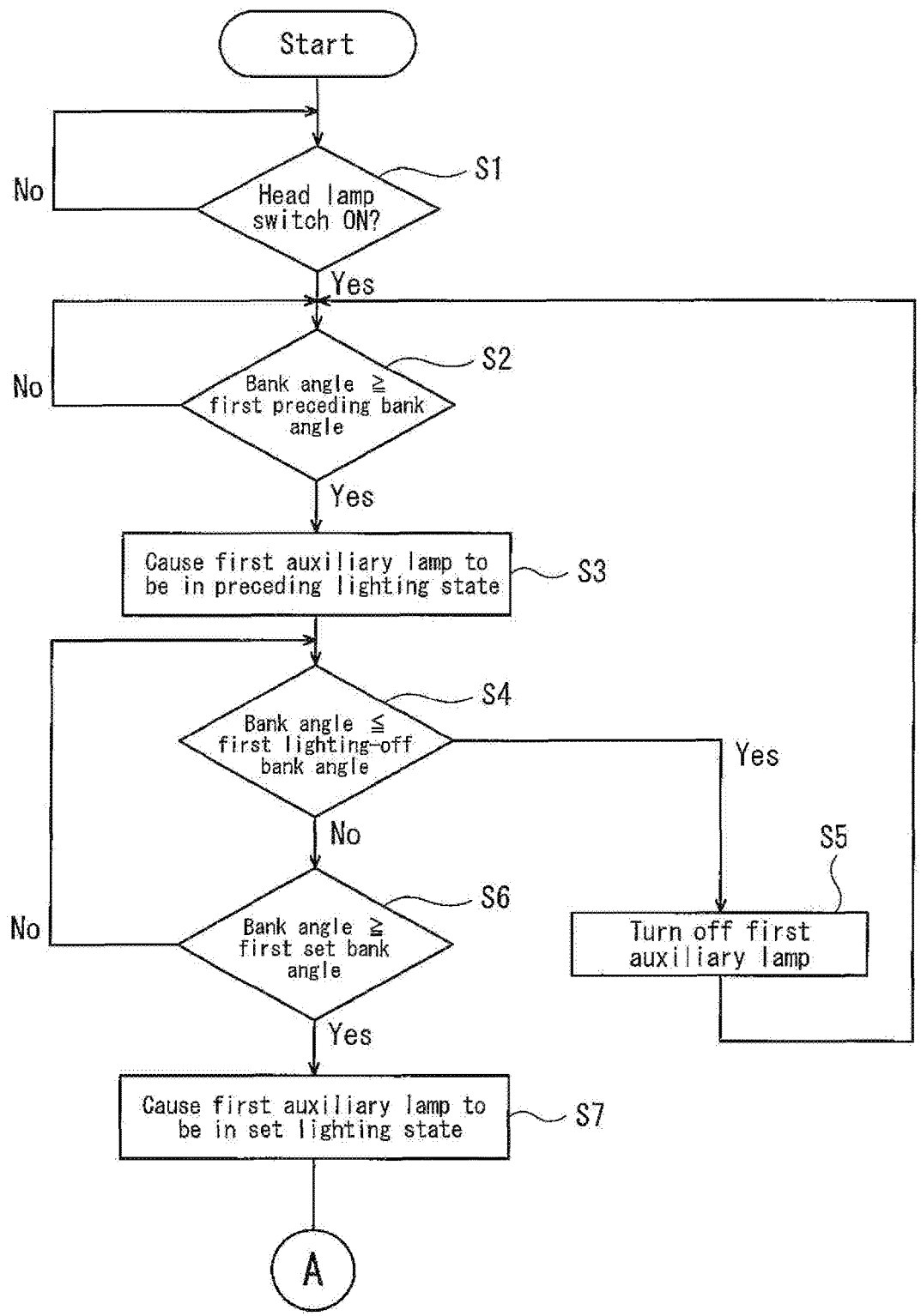
FIG. 4 is a flowchart showing the lighting operation of a first auxiliary lamp of FIG. 1.

FIG. 4 is a flowchart showing the control for the lighting operation of the first auxiliary lamp 6a. Now, with reference to FIG. 4, the lighting operation of the first auxiliary lamp 6a, performed based on FIG. 3 will be described. As shown in FIG. 4, the controller 8 determines whether or not a head lamp switch has been turned on by the rider (step S1). The head lamp switch is a switch used to light (turn on) the head lamp. The head lamp switch of the motorcycle 1 is, for example, an ignition switch attached on the vehicle body 10. When the controller 8 determines that the ignition switch is ON in step S1 (Step S1: Yes), the head lamp 5 is lighted (turned on).

Then, when the motorcycle 1 turns and the vehicle body 10 is banked to the first side in the vehicle width direction, the bank angle calculation section 8a determines whether or the bank angle of the vehicle body 10 is equal to or larger than the first preceding bank angle θ12 (step S2). When the bank angle calculation section 8a determines that the bank angle of the vehicle body 10 is less than the first preceding bank angle θ12 in step S2 (step S2: No), the controller 8 returns to step S2, and the first auxiliary lamp 6a remains off.

On the other hand, when the bank angle calculation section 8a determines that the bank angle of the vehicle body 10 is equal to or larger than the first preceding bank angle θ12 in step S2 (step S2: Yes), the lighting control section 8b causes the first auxiliary lamp 6a to be lighted in the first preceding lighting state P1 (step S3). Then, the bank angle calculation section 8a determines whether or not the bank angle has reached the first lighting-off bank angle θ13 (step S4). When the bank angle calculation section 8a determines that the bank angle has reached the first lighting-off bank angle θ13 in step S4 (step S4: Yes), the first auxiliary lamp 6a is turned off (step S5). Then, the controller 8 returns to step S2, and the bank angle calculation section 8a determines whether or not the bank angle of the vehicle body 10 is equal to or larger than the first preceding bank angle θ12.

On the other hand, when the bank angle calculation section 8a determines that the bank angle has not reached the first lighting-off bank angle θ13 in step S4 (step S4: No), the first auxiliary lamp 6a continues to be lighted in the first preceding lighting state P1. Then, the bank angle calculation section 8a determines whether or not the bank angle is equal to or larger than the first set bank angle θ10 (step S6).

When the bank angle calculation section 8a determines that the bank angle is less than the first set bank angle θ10 in step S6 (step S6: No), the controller 8 returns to step S4, and the first auxiliary lamp 6a continues to be lighted in the first preceding lighting state P1. On the other hand, when the bank angle calculation section 8a determines that the bank angle is equal to or larger than the first set bank angle θ10 (step S6: Yes), the lighting control section 8b causes the first auxiliary lamp 6a to be in the first set lighting state L1 (step S7).

Although not shown in the flowchart of FIG. 4, when the bank angle of the vehicle body 10 is reduced and reaches the first lighting-off bank angle θ13, after the first auxiliary lamp 6a is lighted in the first set lighting state L1, the first auxiliary lamp 6a is turned off. FIG. 4 does not show a flow in which when the bank angle of the vehicle body 10 reaches the lighting-off bank angle, while the auxiliary lamp 6 is lighted in the set lighting state, the first auxiliary lamp 6 is turned off. The righting operation of the second auxiliary lamp 6b or the third auxiliary lamp 6c is the same as that of the first auxiliary lamp 6a by replacing the first auxiliary lamp 6a with the second auxiliary lamp 6b or the third auxiliary lamp 6c and by replacing the preceding bank angle, the lighting-off bank angle and the set bank angle of the first auxiliary lamp 6a with those of the second auxiliary lamp 6b or the third auxiliary lamp 6c. Therefore, the righting operation of the second auxiliary lamp 6b or the third auxiliary lamp 6c will be not described.

After the third auxiliary lamp 6c has reached the third set lighting state L3, all of the auxiliary lamps 6a to 6c are lighted in the set lighting states L1, L2, L3, respectively. Thus, the control for the lighting operations of the auxiliary lamps 6a to 6c is terminated. When the rider turns off the ignition switch while the flowchart of FIG. 4 is executed, the control for the lighting operations of the auxiliary lamps 6a to 6c is terminated.

FIGS. 5A and 5B, FIGS. 6A and 6B, FIGS. 7A and 7B, and FIGS. 8A to 8B show changes in the lighting states of the head lamp 5 and in the auxiliary lamps 6a to 6c and changes in the irradiation regions 50, 60, in a case where the vehicle body 10 is changed from the upright state to the second preceding bank state. FIG. 5A to FIG. 8A are schematic views showing the lighting states of the head lamp 5 and the auxiliary lamps 6a to 6c which are seen from the perspective of the rider straddling the motorcycle 1. In FIG. 5A to FIG. 8A, single hatched lines indicate that the auxiliary lamps 6 are lighted in the preceding lighting states, and double hatched lines indicate that the head lamp 5 is lighted and the auxiliary lamps 6 are lighted in the set lighting states.

FIG. 5A shows the lighting state of the head lamp 5 in a case where the vehicle body 10 is in the upright state. As shown in FIG. 5A, while the vehicle body 10 is traveling in the upright state, the head lamp 5 is lighted. While the motorcycle 1 is traveling, the head lamp 5 is always lighted irrespective of the bank state of the vehicle body 10. FIG. 5B shows the head lamp irradiation region 50 of the head lamp 5 of FIG. 5A. As shown in FIG. 5B, the head lamp 5 irradiates the head lamp irradiation region 50 set in front of the vehicle body 10. The head lamp irradiation region 50 includes a high beam irradiation region and a low beam irradiation region. According to the rider's operation, shifting between the high beam irradiation region and the low beam irradiation region is performed. Hereinafter, description will be given by expressing the low beam irradiation region as head lamp irradiation regions 50, 51. The head lamp irradiation regions 50, 51 are located below a horizontal plane in a region which is in front of the motorcycle 1. In FIGS. 6B to 8B, the head lamp irradiation region 50 to be irradiated in a case where the vehicle body 10 is in the upright state is indicated by a two-dotted line, while the head lamp irradiation region 51 to be irradiated in a case where the vehicle body 10 is in the bank state is indicated by a solid line.

The head lamp 5 forms cut-off lines 50a, 51a when the head lamp 5 is lighted. The cut-off lines 50a, 51a are the lines (light-dark boundary lines) to cut regions to be irradiated in an upward direction, of the head lamp irradiation regions 50, 51, to prevent, for example, the situation in which the person riding in the vehicle coming from the opposite direction is bothered by the glaring light. The cut-off line 50a indicates the cut-off line in a case where the vehicle body 10 is in the upright state. The cut-off line 51a indicates the cut-off line in a case where which the vehicle body 10 is in the bank state. In a case where the vehicle body 10 is in the upright state, the cut-off line 50a extends linearly in the horizontal direction, in parallel with the vehicle width direction of the vehicle body 10.

FIG. 6A shows the lighting states of the head lamp 5 and the auxiliary lamps 6a to 6c which are formed in a case where the vehicle body 10 is in the first preceding bank state. As shown in FIG. 6A, in a case where the vehicle body 10 is in the first preceding bank state, the first auxiliary lamp 6a is lighted in the first preceding lighting state P1. FIG. 6B shows the head lamp irradiation region 50 of the head lamp 5 and the auxiliary lamp irradiation regions 60 of the auxiliary lamps 6, of FIG. 6A. As shown in FIG. 6B, when the vehicle body 10 is in the first preceding bank state, the cut-off line 51a of the head lamp irradiation region 51 is tilted to the first side in the vehicle width direction (lowered at the left from the perspective of the rider straddling the vehicle body 10). At this time, the first auxiliary lamp 6a is lighted in the first preceding lighting state P1 and irradiates the first auxiliary lamp irradiation region 61 so that a front region in the traveling direction (a region to which the motorcycle 1 turns), which cannot be irradiated by the head lamp 5, can be irradiated with the light (beam) emitted from the first auxiliary lamp 6*a*.

In the present embodiment, the first auxiliary lamp 6*a* forms a cut-off line 61*a* when the first auxiliary lamp 6*a* is lighted. This makes it possible to prevent, for example, the situation in which the person riding in the vehicle coming from the opposite direction is bothered by the glaring light emitted from the first auxiliary lamp 6*a*, when the first auxiliary lamp 6*a* reaches the set lighting state while the motorcycle 1 is turning. The auxiliary lamp irradiation region 60 to be irradiated by the auxiliary lamp 6 in a case where the vehicle body 10 is in the preceding bank state includes an auxiliary lamp preceding irradiation region 60*b* located in front of the cut-off line 50*a* of the head lamp irradiation region 50 of the head lamp 5, which is irradiated in a case where the vehicle body 10 is in the upright state. In a case where the vehicle body 10 is in the first preceding bank state, the first auxiliary lamp irradiation region 61 includes a first auxiliary lamp preceding irradiation region 61*b* which is located in front of the cut-off line 50*a* of the head lamp irradiation region 50 of the head lamp 5, which is irradiated in a case where the vehicle body 10 is in the upright state. The first auxiliary lamp 6*a* which irradiates the first auxiliary lamp irradiation region 61 including the first auxiliary lamp preceding irradiation region 61*b* is lighted at luminosity of 300 cd or higher and lower than 1000 cd (300 cd≤luminosity<1000 cd).

FIG. 7A shows the lighting states of the head lamp 5 and the auxiliary lamps 6 which are formed in a case where the vehicle body 10 is in the first set bank state. As shown in FIG. 7A, when the vehicle body 10 is in the first set bank state, the lighting state of the first auxiliary lamp 6*a* shifts to the first set lighting state L1. FIG. 7B shows the head lamp irradiation region 51 of the head lamp 5 and the auxiliary lamp irradiation regions 60 of the auxiliary lamps 6 in the lighting states of FIG. 7A. As shown in FIG. 7B, in a case where the vehicle body 10 is in the first set bank state, the cut-off line 51*a* of the head lamp irradiation region 51 of the head lamp 5 is tilted at a larger degree to the first side in the vehicle width direction than when the vehicle body 10 is in the first preceding bank state. At this time, the first auxiliary lamp irradiation region 61 is irradiated by the first auxiliary lamp 6*a* in such a manner that the cut-off line 61*a* of the first auxiliary lamp irradiation region 61 is substantially parallel to the cut-off line 50*a* of the head lamp irradiation region 50 in a case where the vehicle body 10 is in the upright state. At this time, the first auxiliary lamp 6*a* is lighted at maximum luminosity.

FIG. 8A shows the lighting states of the head lamp 5 and the auxiliary lamps 6 which are formed in a case where the vehicle body 10 is in the second preceding bank state. As shown in FIG. 8A, in a case where the vehicle body 10 is in the second preceding bank state, the second auxiliary lamp 6*b* is lighted in the second preceding lighting state P2, in addition to the lighting of the head lamp 5 and the first auxiliary lamp 6*a*. FIG. 8B shows the head lamp irradiation region 51 of the head lamp 5 and the auxiliary lamp irradiation regions 60 of the auxiliary lamps 6 in the lighting states of FIG. 8A. As shown in FIG. 8B, in a case where the vehicle body 10 is in the second preceding bank state, the cut-off line 51*a* of the head lamp irradiation region 51 of the head lamp 5 is tilted at a larger degree to the first side in the vehicle width direction than in a case where the vehicle body 10 is in the first set bank state, and the cut-off line 61*a* of the first auxiliary lamp irradiation region 61 irradiated by the first auxiliary lamp 6*a* is tilted to the first side in the vehicle width direction. At this time, the second auxiliary lamp 6*b* is lighted in the second preceding lighting state P2, and irradiates a second auxiliary lamp irradiation region 62 so that a front region in the traveling direction (region to which the motorcycle 1 turns), which cannot be irradiated by the head lamp 5 and the first auxiliary lamp 6*a*, can be irradiated by the second auxiliary lamp 6*b*.

As in the case of the first auxiliary lamp 6*a*, the second auxiliary lamp 6*b* forms a cut-off line 62*a* when the second auxiliary lamp 6*b* is lighted. The second auxiliary lamp irradiation region 62 includes a second auxiliary lamp preceding irradiation region 62*b* located in front of the head lamp irradiation region 50 in a case where the vehicle body 10 is in the upright state. At this time, the first auxiliary lamp 6*a* is lighted at maximum luminosity. The second auxiliary lamp 6*b* which irradiates the second auxiliary lamp irradiation region 62 including the second auxiliary lamp preceding irradiation region 62*b* is lighted at luminosity of 300 cd or higher and lower than 1000 cd (300 cd≤luminosity<1000 cd).

In the above-described embodiment, when the second auxiliary lamp 6*b* reaches the second preceding lighting state P2, the first auxiliary lamp 6*a* may be turned off or its luminosity of the light may be reduced.

The motorcycle 1 configured in the above-described manner can obtain advantages described below.

In a case where the vehicle body 10 is banked to the preceding bank state in which the bank angle of the vehicle body 10 is smaller than that of the predetermined set bank state, the auxiliary lamp 6 becomes the preceding lighting state. Thereby, the front region in the traveling direction can be irradiated by the auxiliary lamp 6 before the auxiliary lamp 6 reaches the set lighting state. This allows the rider to well see the road surface of the region to which the motorcycle 1 turns, while the motorcycle 1 is turning. The auxiliary lamp 6 is first lighted in the preceding lighting state at luminosity lower than that of the set lighting state, and then shifts to the set lighting state. This makes it possible to reduce a change in the luminosity of the light emitted from the auxiliary lamp 6. Therefore, it becomes possible to prevent a situation in which the auxiliary lamp 6 is lighted abruptly in the set lighting state, and thereby the rider feels discomfort.

In the preceding bank state, the auxiliary lamp 6 becomes the preceding lighting state in which the auxiliary lamp 6 is lighted at luminosity lower than that of the set lighting state. This makes it possible to prevent, for example, the situation in which the person riding in the vehicle coming from the opposite direction is bothered by the glaring light emitted from the auxiliary lamp 6. Thus, since the auxiliary lamp 6 is lighted in the preceding lighting state before the auxiliary lamp 6 reaches the set lighting state, the rider can well see the road surface of the region to which the motorcycle 1 turns, while the motorcycle 1 is turning, the rider does not feel discomfort due to the lighting of the auxiliary lamp, and it becomes possible to prevent, for example, the situation in which the person riding in the vehicle coming from the opposite direction is bothered by the glaring light emitted from the auxiliary lamp 6.

The preceding lighting state and the set lighting state are realized in such a manner that the luminosity of the light emitted from each of the auxiliary lamps 6*a* to 6*c* is adjusted. This can eliminate a need for an additional auxiliary lamp to be lighted in the preceding lighting state. As a result, the number of members and cost can be reduced.

Even in a case where some time is taken to light each of the auxiliary lamps 6*a* to 6*c*, due to the influences of a response time which is a sum of time when the controller 8 outputs the control signal to each of the auxiliary lamps 6a to 6c based on the detected value of the sensor 7, time when each of the auxiliary lamps 6a to 6c emits the light, and the like, the auxiliary lamp 6 can be lighted in the preceding lighting state at earlier time.

The auxiliary lamp 6 is lighted in the preceding lighting state before the vehicle body 10 reaches the set bank state, while the motorcycle 1 is turning on a curve, an intersection, or the like, and irradiates the front region in traveling direction (emits the light to the front region in traveling direction). This allows the person riding in a vehicle coming from the opposite direction and located at a region that is beyond the curve or the intersection to well see the light emitted to the road surface 15 and recognize the existence of the motorcycle 1 at earlier time.

The lighting control section 8b controls the auxiliary lamps 6a to 6c in such a manner that the luminosity of the light emitted from each of the auxiliary lamps 6a to 6c is increased with an increase in the bank angle of the vehicle body 10 after each of the auxiliary lamps 6a to 6c has reached the set lighting state. With this control, it becomes possible to prevent a rapid change in the luminosity of the light emitted from each of the auxiliary lamps 6a to 6c when each of the auxiliary lamps 6a to 6c reaches the set lighting state. Therefore, it becomes possible to effectively prevent the rider from feeling discomfort due to the lighting of the auxiliary lamps 6a to 6c.

At least a portion of the auxiliary lamp irradiation region 60 to be irradiated by the auxiliary lamp 6 in a case where the vehicle body 10 is in the preceding bank state is the auxiliary lamp preceding irradiation region 60b located in front of the cut-off line 50a of the head lamp irradiation region 50 irradiated by the head lamp 5, in a case where the vehicle body 10 is in the upright state, and the luminosity of the light emitted from the auxiliary lamp 6 which irradiates the auxiliary lamp irradiation region 60 is lower when the vehicle body 10 is in the preceding bank state than when the vehicle body 10 is in the set bank state. This allows the rider to well see the front region in the traveling direction, because the auxiliary lamp preceding irradiation region 60b is irradiated by the auxiliary lamp 6 while the motorcycle 1 is turning.

Since the luminosity of the light emitted from the auxiliary lamp 6 which irradiates the auxiliary lamp preceding irradiation region 60b in a case where the vehicle body 10 is in the preceding bank state is lower than that in a case where the vehicle body 10 is in the set bank state, it becomes possible to effectively prevent the rider from feeling discomfort when the auxiliary lamp 6 is lighted. Thus, since the auxiliary lamp irradiation region 60 includes the auxiliary lamp preceding irradiation region 60b, it becomes possible for the rider to well see the front region in traveling direction and prevent the rider from feeling discomfort due to the lighting of the auxiliary lamp 6 while the motorcycle 1 is turning.

In the set bank state of the vehicle body 10, the luminosity of the light of the auxiliary lamp 6 with which the auxiliary lamp preceding irradiation region 60 located in front of the cut-off line 50a of the head lamp irradiation region 5 is irradiated, is set to a value which is less than the upper limit value of the luminosity in a region which is in front of the cut-off line 50a. The upper limit value is designated by law. This makes it possible to prevent, for example, the situation in which the person riding in the vehicle coming from the opposite direction is bothered by the glaring light emitted from the auxiliary lamp 6 lighted when the vehicle body 10 is in the preceding bank state.

In the preceding bank state of the vehicle body 10, at least a portion of the auxiliary lamp irradiation region 60 (the auxiliary lamp preceding irradiation region 60b) is located in front of the cut-off line 51a of the head lamp irradiation region 51 irradiated by the head lamp 5. In the set bank state of the vehicle body 10, the auxiliary lamp irradiation region 60 is located rearward relative to the cut-off line 51a of the head lamp irradiation region 51 irradiated by the head lamp 5. In this way, in the preceding bank state of the vehicle body 10, the auxiliary lamp 6 is lighted at specified luminosity at earlier time while preventing, for example, the situation in which the person riding in the vehicle coming from the opposite direction is bothered by the glaring light. In contrast, in the set bank state of the vehicle body 10, the auxiliary lamp irradiation region 60 is located rearward relative to the cut-off line 51a of the head lamp irradiation region 51 irradiated by the head lamp 5. Thereby, by increasing the luminosity of the light emitted from the auxiliary lamp 6, the rider can well see the road surface 15 in the front region in traveling direction.

The lighting control section 8b lights the auxiliary lamp 6 in such a manner that the luminosity of the light emitted from the auxiliary lamp 6 is constant in a specified range for a time period from when the preceding bank angle is calculated until the set bank angle is calculated. With this control for the lighting operation of the auxiliary lamp 6, the front region in the traveling direction can be irradiated at suitable luminosity at earlier time, and it becomes possible to effectively prevent, for example, the situation in which the person riding in the vehicle coming from the opposite direction is bothered by the glaring light emitted from the auxiliary lamp 6 in the specified range for the time period from when the preceding bank angle is calculated until the set bank angle is calculated, compared to a case where the luminosity of the light emitted from the auxiliary lamp 6 is increased with an increase in the degree of the bank angle of the vehicle body 10. The luminosity of the light emitted from the auxiliary lamp 6 in a case where the vehicle body 10 is in the preceding bank state is set to the value less than 1000 cd to prevent, for example, the situation in which the person riding in the vehicle coming from the opposite direction is bothered by the glaring light emitted from the auxiliary lamp 6. This makes it possible to prevent, for example, the situation in which the person riding in the vehicle coming from the opposite direction is bothered by the glaring light emitted from the auxiliary lamp 6 lighted when the vehicle body 10 is in the preceding bank state.

The luminosity of the light emitted from the auxiliary lamp 6 in a case where the vehicle body 10 is in the preceding bank state is set to the value equal to or higher than 300 cd for the rider to well see the road surface 15 of the front region in the traveling direction.

The bank angle of the vehicle body 10 in a case where the auxiliary lamp 6 is lighted after the vehicle body 10 has reached the preceding bank state is larger than that in a case where the auxiliary lamp 6 is turned off after the vehicle body 10 has exited the preceding bank state. In this way, since the auxiliary lamp 6 is lighted and turned off in different bank states of the vehicle body 10, a hysteresis can be set in the lighting operation of the auxiliary lamp 6. This makes it possible to prevent a situation in which the auxiliary lamp 6 is lighted and turned off in repetition, at a boundary between the state in which the auxiliary lamp 6 is lighted and the state in which the auxiliary lamp 6 is turned off.

The motorcycle 1 includes the plurality of auxiliary lamps 6a to 6c which become the set lighting states at different set bank angles, respectively. In the present embodiment, between the first set lighting state L1 and the second set lighting state L2, the second auxiliary lamp 6b is lighted in the second preceding lighting state P2, while between the second set lighting state L2 and the third set lighting state L3, the third auxiliary lamp 6c is lighted in the third preceding lighting state P3. This allows the rider to well see the road surface of the front region in the traveling direction while preventing a situation in which the plurality of auxiliary lamps 6a to 6c are lighted only in the set bank states, respectively, in a stepwise manner and thereby the rider feels discomfort.

As described above, between the first set lighting state L1 and the second set lighting state L2, the second auxiliary lamp 6b is lighted in the second preceding lighting state P2, while between the second set lighting state L2 and the third set lighting state L3, the third auxiliary lamp 6c is lighted in the third preceding lighting state P3. This allows the rider to well see the road surface of the front region in the traveling direction while maintaining a range of the bank angle which can be covered.

Embodiment 2

In the motorcycle according to Embodiment 2, the control for the lighting operations of the auxiliary lamps 6 according to Embodiment 1 is modified. Hereinafter, regarding the control for the lighting operations of the auxiliary lamps 6 according to Embodiment 2, differences from the control for the lighting operations of the auxiliary lamps 6 according to Embodiment 1 will be described.

Figure 9:
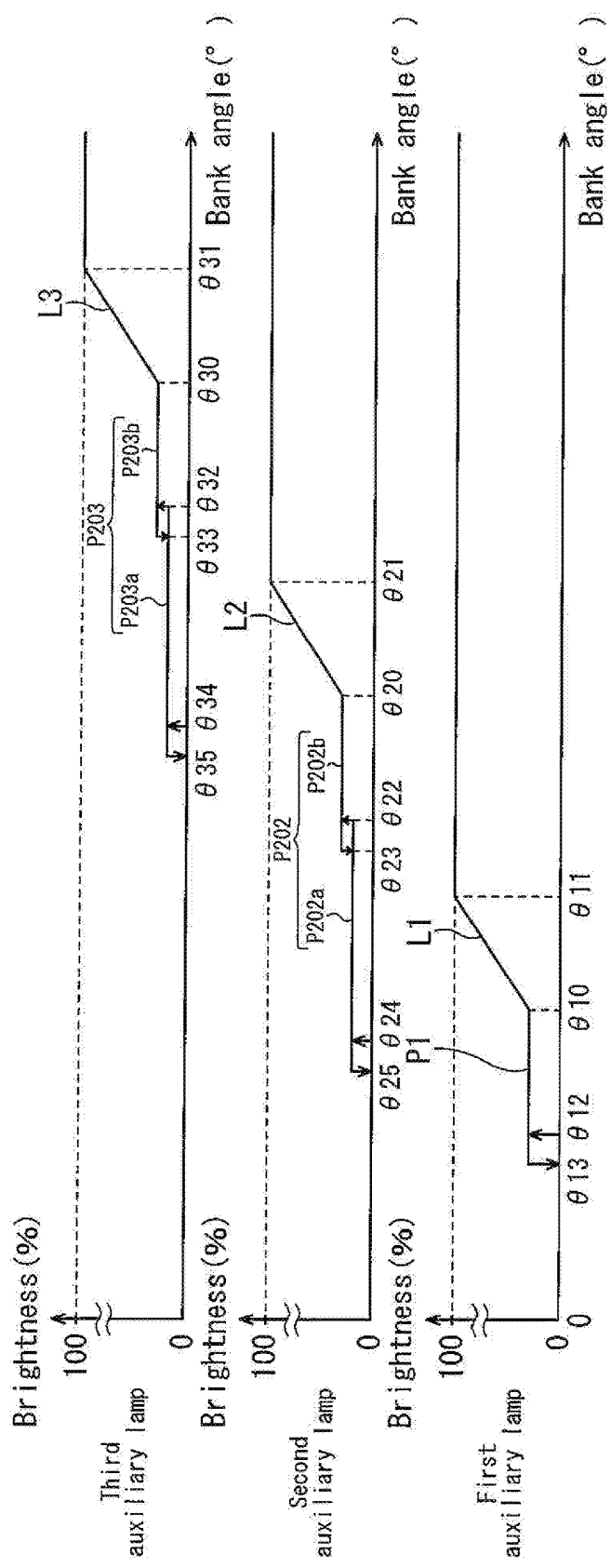
FIG. 9 is a view showing a control performed for the lighting operations of the auxiliary lamps according to Embodiment 2, corresponding to FIG. 3.

FIG. 9 is a view showing the control performed for the lighting operations of the auxiliary lamps 6 according to Embodiment 2, corresponding to FIG. 3. As shown in FIG. 9, a preceding lighting state P202 of the second auxiliary lamp 6b includes an initial preceding lighting state P202a and a subsequent preceding lighting state P202b, while a preceding lighting state P203 of the third auxiliary lamp 6c includes an initial preceding lighting state P203a and a subsequent preceding lighting state P203b. In the lighting operation of the second auxiliary lamp 6b and the lighting operation of the third auxiliary lamp 6c, the preceding bank angle includes an initial preceding bank angle and a subsequent preceding bank angle larger than the initial preceding bank angle. In the present embodiment, for example, a second initial preceding bank angle θ24 of the second auxiliary lamp 6b is 8 degrees, and a second subsequent preceding bank angle θ22 of the second auxiliary lamp 6b is 15 degrees. A third initial preceding bank angle θ34 of the third auxiliary lamp 6c is 18 degrees, and a third subsequent preceding bank angle θ32 of the third auxiliary lamp 6c is 25 degrees.

The initial preceding lighting state P202a is defined as a state in which the second auxiliary lamp 6b is lighted at luminosity lower than that in the set lighting state L2, when the vehicle body 10 is banked at the initial preceding bank angle. The initial preceding lighting state P203a is defined as a state in which the third auxiliary lamp 6c is lighted at luminosity lower than that in the set lighting state L3, when the vehicle body 10 is banked at the initial preceding bank angle. The subsequent preceding lighting state P202b is defined as a state in which the second auxiliary lamp 6b is lighted at luminosity higher than that in the initial preceding lighting state P202a and lower than that in the set lighting state L2, when the vehicle body 10 is banked at the subsequent preceding bank angle. The subsequent preceding lighting state P203b is defined as a state in which the third auxiliary lamp 6c is lighted at luminosity higher than that in the initial preceding lighting state P203a and lower than that in the set lighting state L3, when the vehicle body 10 is banked at the subsequent preceding bank angle.

In the motorcycle 1 according to Embodiment 2 configured in the above-described manner, the same advantages as those of Embodiment 1 can be obtained. In addition, the preceding lighting state P202 of the second auxiliary lamp 6b includes the initial preceding lighting state P202a and the subsequent preceding lighting state P202b, while the preceding lighting state P203 of the third auxiliary lamp 6c includes the initial preceding lighting state P203a and the subsequent preceding lighting state P203b. In this configuration, the second auxiliary lamp 6b and the third auxiliary lamp 6c are lighted in such a manner that the luminosity of the light emitted from each of the second auxiliary lamp 6b and the third auxiliary lamp 6c is gradually increased until the second auxiliary lamp 6b and the third auxiliary lamp 6c reach the set lighting states L2, L3, respectively. This makes it possible to more effectively prevent a situation which each of the second auxiliary lamp 6b and the third auxiliary lamp 6c is lighted (turned on) abruptly when the vehicle body 10 is banked at the set bank angle, and thereby the rider feels discomfort.

Alternatively, the first preceding lighting state P1 of the first auxiliary lamp 6a may include an initial preceding lighting state and a subsequent preceding lighting state. In this case, to prevent, for example, the situation in which the person riding in the vehicle coming from the opposite direction is bothered by the glaring light emitted from the first auxiliary lamp 6a, the value of the initial preceding bank angle, corresponding to the lighting operation of the first auxiliary lamp 6a, is preferably 5 degrees or larger.

Embodiment 3

In the motorcycle according to Embodiment 3, the control for the lighting operations of the auxiliary lamps 6 according to Embodiment 2 is modified. Hereinafter, regarding the control for the lighting operations of the auxiliary lamps 6 according to Embodiment 3, differences from the control for the lighting operations of the auxiliary lamps 6 according to Embodiment 2 will be described.

Figure 10:
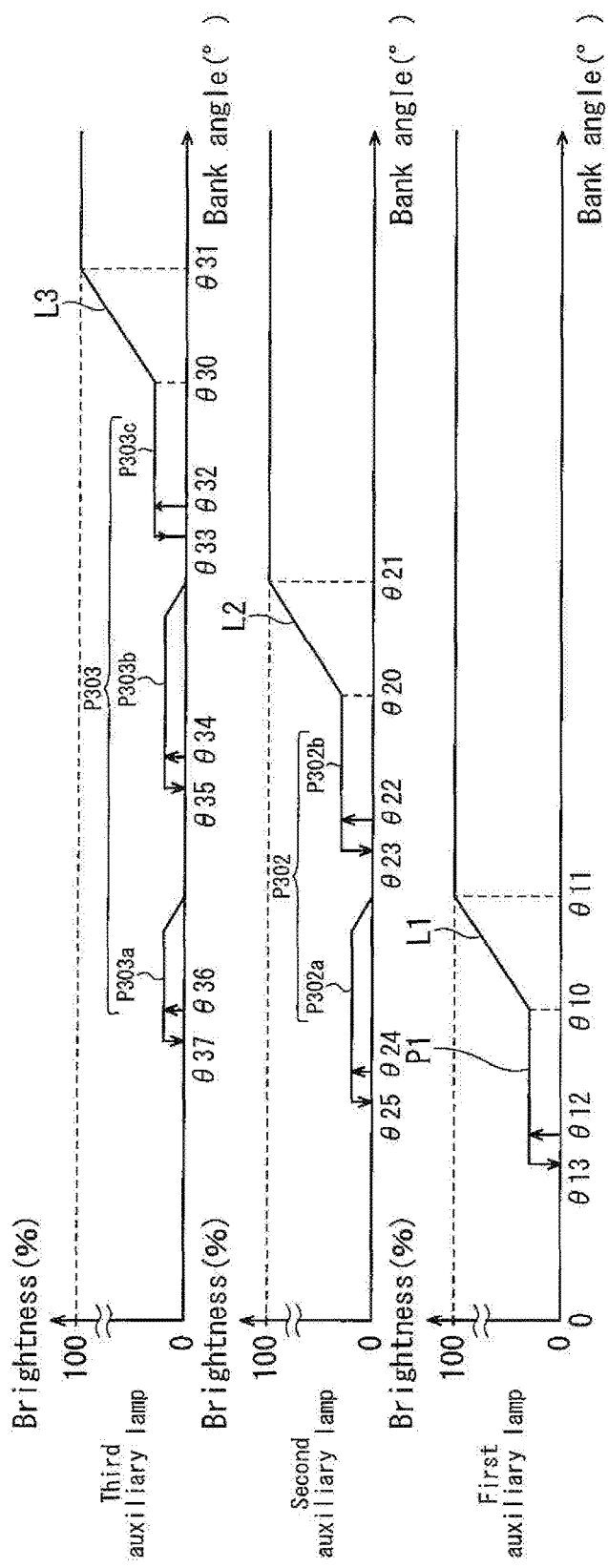
FIG. 10 is a view showing a control performed for the lighting operations of the auxiliary lamps according to Embodiment 3, corresponding to FIG. 3.

FIG. 10 is a view showing the control performed for the lighting operations of the auxiliary lamps 6 according to Embodiment 3, corresponding to FIG. 3. As shown in FIG. 10, in a preceding lighting state P302 of the second auxiliary lamp 6b, an initial preceding lighting state P302a and a subsequent preceding lighting state P302b are discontinuous. More specifically, at a time point when the first auxiliary lamp 6a is lighted in the first set lighting state L1 at maximum luminosity, in a case where the second auxiliary lamp 6b is in the initial preceding lighting state P302a, the initial preceding lighting state P302a ends and the second auxiliary lamp 6b is temporarily turned off. A value which is a sum of the luminosity of the light emitted from the first auxiliary lamp 6a in the first preceding lighting state P1, the luminosity of the light emitted from the second auxiliary lamp 6b lighted when the first auxiliary lamp 6a is in the first preceding lighting state P1, and the luminosity of the light emitted from the third auxiliary lamp 6c lighted when the first auxiliary lamp 6a is in the first preceding lighting state P1, is set to a value less than 1000 cd, to prevent, for example, the situation in which the person riding in the vehicle coming from the opposite direction is bothered by the glaring light emitted from the auxiliary lamps 6a to 6c.

A preceding lighting state P303 of the third auxiliary lamp 6c includes an initial preceding lighting state P303a, a subsequent preceding lighting state P303b, and a last preceding lighting state P303c (preceding lighting state P303c that is subsequent to the subsequent preceding lighting state P303b). The initial preceding lighting state P303a, the subsequent preceding lighting state P303b, and the last preceding lighting state P303c are discontinuous. Specifically, when the first auxiliary lamp 6a is lighted in the first preceding lighting state P1, the third auxiliary lamp 6c is lighted in the initial preceding lighting state P303a, as in the initial preceding lighting state P302a of the second auxiliary lamp 6b.

When the first auxiliary lamp 6a is lighted in the first set lighting state L1 at maximum luminosity, the initial preceding lighting state P303a ends, and the third auxiliary lamp 6c is temporarily turned off. When the second auxiliary lamp 6b is lighted in the subsequent preceding lighting state P302b, the third auxiliary lamp 6c becomes the subsequent preceding lighting state P303b. When the second auxiliary lamp 6b is lighted in the second set lighting state L2 at maximum luminosity, the subsequent preceding lighting state P303b ends, and the third auxiliary lamp 6c is temporarily turned off again. A value of the luminosity which is a sum of the luminosity in a case where the second auxiliary lamp 6b is lighted in the subsequent preceding lighting state P302b and the luminosity of the light emitted from the third auxiliary lamp 6c lighted when the second auxiliary lamp 6b is in the subsequent preceding lighting state P302b, is set to a value less than 1000 cd, to prevent, for example, the situation in which the person riding in the vehicle coming from the opposite direction is bothered by the glaring light.

In Embodiment 3 configured in the above-described manner, the same advantages as those of the above-described embodiments can be obtained. In addition, for a time period from when the first preceding bank angle θ12 is calculated until the first set bank angle θ10 is calculated, namely, when the first auxiliary lamp 6a is lighted in the first preceding lighting state P1, the second auxiliary lamp 6b is lighted in the second initial preceding lighting state P302a, and the third auxiliary lamp 6c is lighted in the third initial preceding lighting state P303a. Therefore, the front region in the traveling direction can be irradiated with the light (beam), and the rider can well see the road surface of the front region in the traveling direction. Also, the person riding in the vehicle coming from the opposite direction can well see the light with which the road surface is irradiated. Further, at an earlier stage after the vehicle body 10 is banked to the first side in the vehicle width direction, the plurality of auxiliary lamps 6a to 6c are lighted at the luminosity lower than that in the set lighting states L1, L2, L3. Therefore, seamless lighting of the auxiliary lamps 6 can be realized.

Embodiment 4

In the motorcycle according to Embodiment 4, the control for the lighting operations of the auxiliary lamps 6 according to Embodiment 1 is modified. Hereinafter, regarding the control for the lighting operations of the auxiliary lamps 6 according to Embodiment 4, differences from the control for the lighting operations of the auxiliary lamps 6 according to Embodiment 1 will be described.

Figure 11:
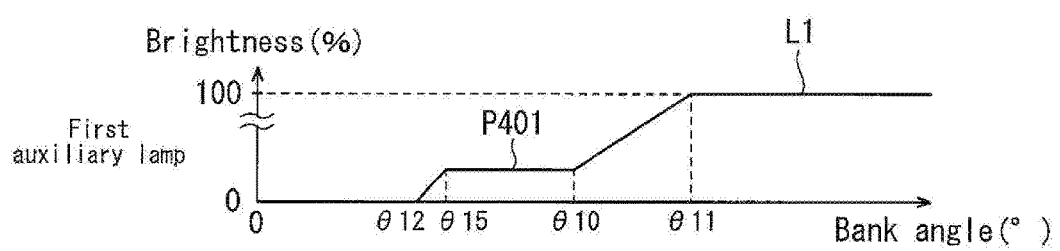
FIG. 11 is a view showing a control performed for the lighting operation of the auxiliary lamp according to Embodiment 4, corresponding to FIG. 3.

FIG. 11 is a view showing the control performed for the lighting operation of the auxiliary lamp 6 according to Embodiment 4, corresponding to FIG. 3. Now, a case where the control for the lighting operation according to Embodiment 4 is performed for the first auxiliary lamp 6a will be described. As shown in FIG. 11, the first preceding bank angle θ12 of the first auxiliary lamp 6a is set to, for example, 5 degrees. When the vehicle body 10 is banked to an extent that the first preceding bank angle θ12 is calculated, the bank angle calculation section 8a detects that the vehicle body 10 has reached the preceding bank state. The luminosity of the light emitted from the first auxiliary lamp 6a is controlled to be increased, as the bank angle of the vehicle body 10 is increased after the bank angle calculation section 8a detects that the vehicle body 10 has reached the preceding bank state, namely, the bank angle is increased from the first preceding bank angle θ12.

Then, when the vehicle body 10 is banked to an extent that a first preceding lighting completion bank angle θ15 is calculated, the first auxiliary lamp 6a is lighted at maximum luminosity in the preceding lighting state P401. The preceding lighting completion bank angle is defined as a bank angle at a time point when the luminosity of the light emitted from the auxiliary lamp 6 changes from a value less than the maximum luminosity in the preceding lighting state P401 to the maximum luminosity. After that, in a range from the first preceding lighting completion bank angle θ15 to the first set bank angle θ10, the luminosity of the light emitted from the first auxiliary lamp 6a is constant. In the present embodiment, when the bank angle of the first auxiliary lamp 6a is in a range of 5 to 6 degrees, the luminosity of the light emitted from the first auxiliary lamp 6a is increased with an increase in the value of the bank angle. Then, for example, when the bank angle of the first auxiliary lamp 6a is in a range of 6 to 10 degrees, the luminosity of the light emitted from the first auxiliary lamp 6a is constant.

In Embodiment 4 configured in the above-described manner, the same advantages as those of the above-described embodiments can be obtained. The luminosity of the light emitted from the first auxiliary lamp 6a is controlled to be gradually increased, as the bank angle of the vehicle body 10 is increased after the bank angle calculation section 8a detects that the vehicle body 10 has reached the preceding bank state. This makes it possible to prevent a rapid change in brightness just after the first auxiliary lamp 6a is lighted in the preceding lighting state P401 and to more effectively prevent discomfort of the rider.

Embodiment 5

In the motorcycle according to Embodiment 5, the control for the lighting operations of the auxiliary lamps 6 according to Embodiment 1 is modified. Hereinafter, regarding the control for the lighting operations of the auxiliary lamps 6 according to Embodiment 5, differences from the control for the lighting operations of the auxiliary lamps 6 according to Embodiment 1 will be described.

To light the auxiliary lamp 6, a response time which is a sum of time when the sensor 7 outputs the signal to the controller 8, time when the controller 8 outputs the control signal to the auxiliary lamp 6 based on the signal output from the sensor 7, time when the light source of the auxiliary lamp 6 emits the light, and the like, is required. For example, in a case where the vehicle body 10 is banked quickly while the motorcycle 1 is traveling, the rider feels a time lag of lighting of the auxiliary lamp 6. Specifically, a time lag occurs in the timing at which each of the auxiliary lamps 6a to 6c which is going to irradiate the region in the traveling direction (a region to which the motorcycle 1 turns), in the region which is inward with respect to the turning direction of the vehicle body 10, starts to be lighted.

In the present embodiment, each of the auxiliary lamps 6a to 6c is lighted in the preceding lighting state when the vehicle body 10 is in the preceding bank state before the vehicle body 10 reaches the set bank state, and the timing at which each of the auxiliary lamps 6a to 6c becomes the set lighting state is changed based on the bank angular velocity of the vehicle body 10. In brief, the value of the set bank angle at which each of the auxiliary lamps 6a to 6c becomes the set lighting state is compensated based on the bank angular velocity of the vehicle body 10.

Figure 12:
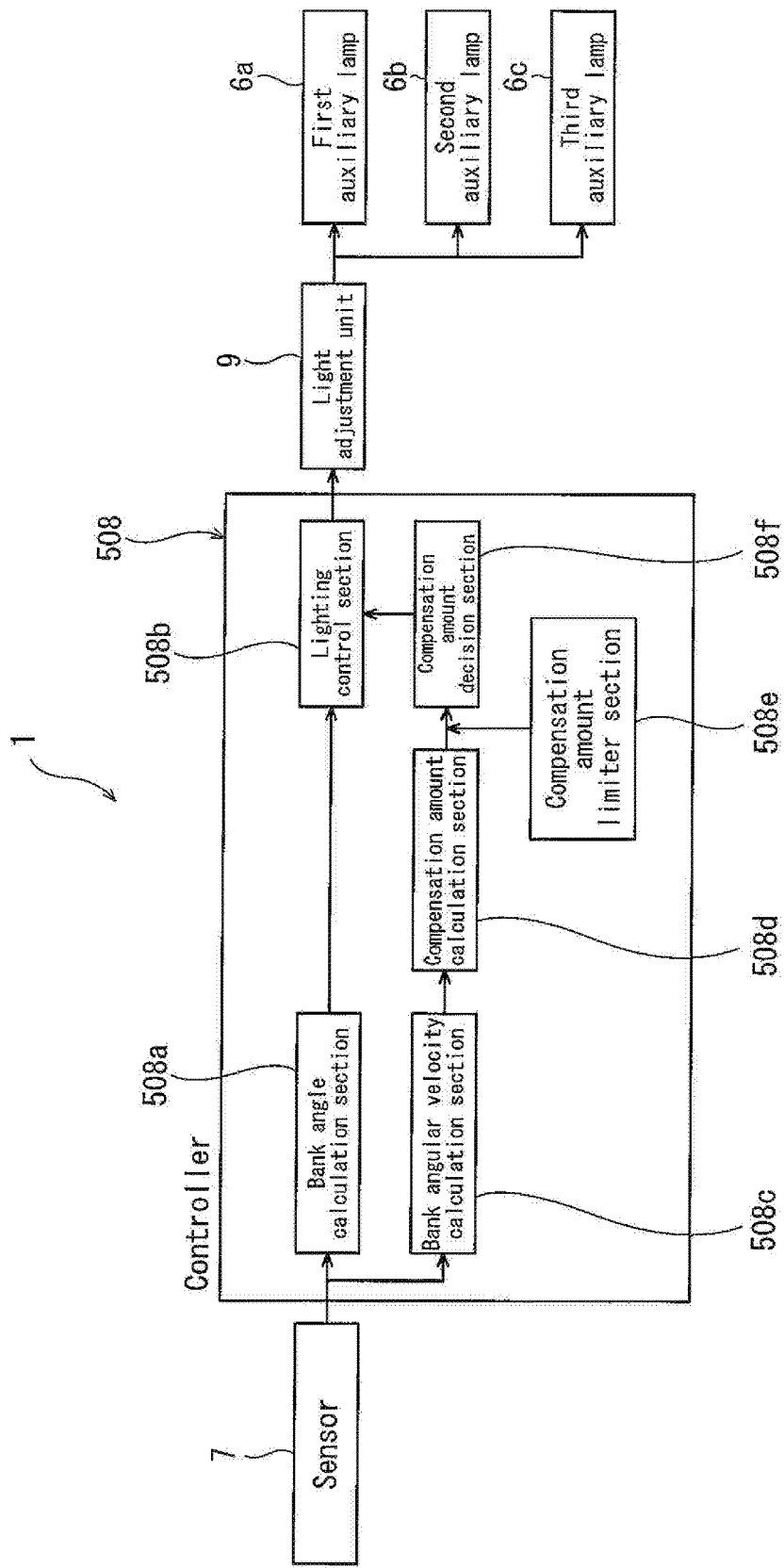
FIG. 12 is a view showing a control performed for the lighting operations of the auxiliary lamps according to Embodiment 5, corresponding to FIG. 3.

FIG. 12 is a view of the motorcycle 1 according to Embodiment 5, corresponding to FIG. 2. As shown in FIG. 12, a controller 508 includes a bank angle calculation section 508a, a lighting control section 508b, a bank angular velocity calculation section 508c, a compensation amount calculation section 508d, a compensation amount limiter section 508e, and a compensation amount decision section 508f.

The bank angular velocity calculation section 508c calculates a bank angular velocity in a period that passes until the vehicle body 10 reaches the set bank state, based on a detection signal indicative of the bank angular velocity output from the sensor 7. The compensation amount calculation section 508d calculates a temporary compensation amount corresponding to the bank angular velocity calculated by the bank angular velocity calculation section 508c.

The compensation amount limiter section 508e limits the compensation amount of the set bank angle to a predetermined upper limit value or less. In the present embodiment, for example, the upper limit value of the compensation amount is set to, for example, 3 degrees. The compensation amount decision section 508f determines whether or not the temporary compensation amount calculated by the compensation amount calculation section 508d is larger than the upper limit value of the compensation amount limiter section 508e, and decides either the temporary compensation amount or the upper limit value, as the compensation amount of the set bank angle.

Figure 13:
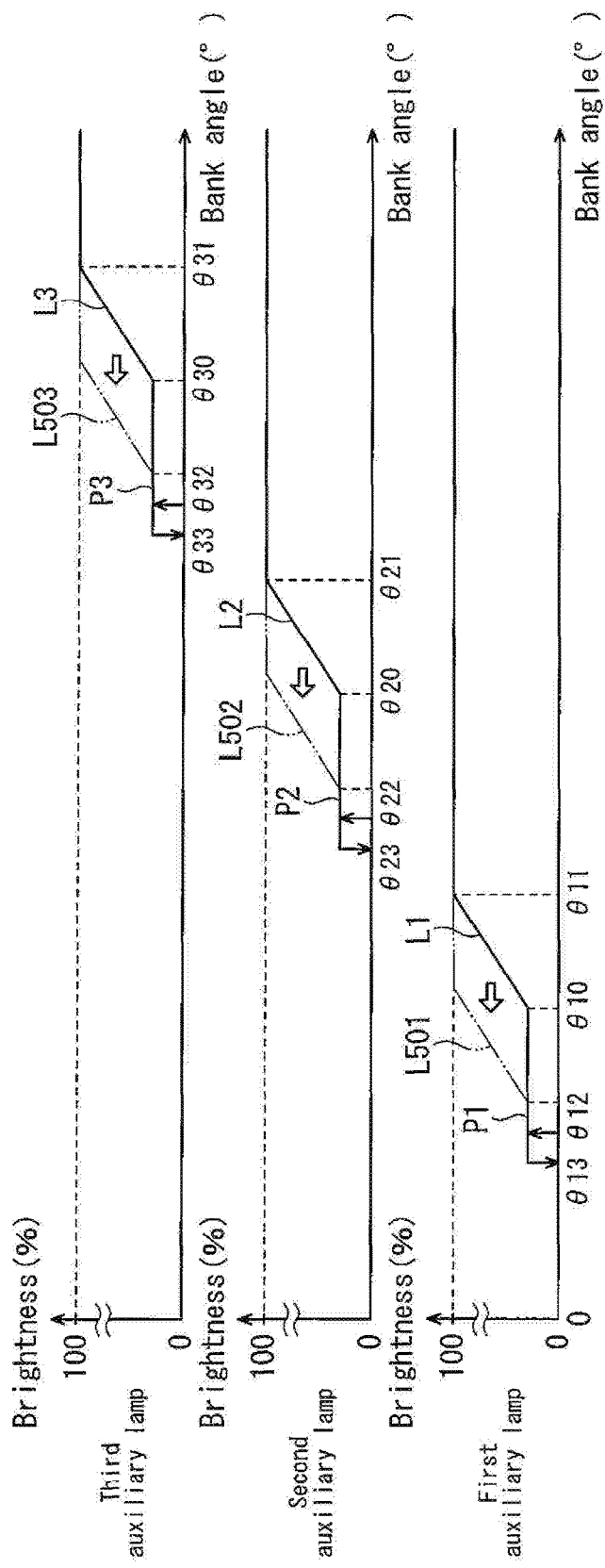
FIG. 13 is a view showing a control performed for the lighting operations of the auxiliary lamps according to Embodiment 5, corresponding to FIG. 3.

FIG. 13 is a view showing a control performed for the lighting operations of the auxiliary lamps 6 according to Embodiment 5, corresponding to FIG. 3. As shown in FIG. 13, the value of the set bank angle corresponding to the lighting operation of each of the auxiliary lamps 6a to 6c is compensated based on the compensation amount decided by the compensation amount decision section 508f in such a manner that the value of the set bank angle is reduced (see arrows in FIG. 13). For example, when the compensation amount decision section 508f determines that the compensation amount of the set bank angle is the upper limit value, the value of the set bank angle of each of the auxiliary lamps 6a to 6c is compensated to be reduced by the upper limit value (see two-dotted lines of FIG. 13). With this control, the set lighting states L501 to L503 of the auxiliary lamps 6a to 6c start at earlier timings, respectively.

In Embodiment 5, the same advantages as those of the above-described embodiments can be obtained. In addition, the timings at which the set lighting states L1 to L3 of the auxiliary lamps 6a to 6c start can be decided according to the bank angular velocities, in view of a future vehicle body posture. This allows the auxiliary lamps 6a to 6c to be lighted in the set lighting states L1 to L3 at suitable timings, respectively, according to the bank angular velocities of the vehicle body 10 while the motorcycle 1 is traveling. Therefore, the rider can see the road surface well. Further, it is not necessary to increase the lighting period of the set lighting state to prevent a lighting lag of each of the auxiliary lamps 6a to 6c. Thus, occurrence of an excess lighting time period can be prevented.

Regarding the lighting operations of the auxiliary lamps 6, the values of the preceding bank angles as well as the values of the set bank angles may be compensated according to the bank angular velocities. In a case where the preceding bank angle of the first auxiliary lamp 6a is compensated, the compensation amount is preferably set to prevent, for example, the situation in which the person riding in the vehicle coming from the opposite direction is bothered by the glaring light, due to the fact that the first preceding lighting state P1 starts too early. Further, a change rate of brightness (luminosity) of the light of each of the auxiliary lamps 6 with respect to the bank angle may be changed according to the bank angular velocity. Specifically, the change rate of brightness (luminosity) of the light of the each of auxiliary lamps 6 with respect to the bank angle may be increased so that the brightness of the light of the each of auxiliary lamps 6 reaches the maximum luminosity at an earlier time, as the bank angular velocity which causes the vehicle body 10 to be banked to the first side in the vehicle width direction increases, namely, a vehicle body posture at which the vehicle body 10 is more quickly banked to the first side in the vehicle width direction is detected.

The present invention is not limited to the above-described embodiments. The above-described configurations may be changed, added to or deleted from, within a scope of the spirit of the preset invention. The above-described embodiments may be combined. For example, a part of the configuration of one embodiment may be applied to the other embodiments. Also, a part of the configuration of one embodiment may be separated from the configuration of this embodiment and extracted.

Although in the above-described embodiments, the bank state of the vehicle body 10 is exemplary used as the event of the vehicle which occurs while the vehicle is traveling, and the lighting operation of each of the auxiliary lamps 6 is controlled according to the bank state of the vehicle body 10, each of the auxiliary lamps 6 may be controlled according to another event. For example, when the motorcycle is going to just enter a curve or an intersection, the motorcycle 1 is decelerated, and thereby the posture of the vehicle body 10 is changed in such a manner that the front portion of the vehicle body 10 is lowered. The controller 8 may determine whether or not the motorcycle 1 is going to just enter the curve or the intersection by detecting a change in the posture of the vehicle body 10 which is caused by a pitching motion of the vehicle body 10, as the event of the vehicle which occurs while the motorcycle 1 is traveling. Based on the detected event, the lighting operation of the auxiliary lamp 6 may be controlled. Specifically, a gyro sensor around the axis (pitching axis) of the vehicle body 10 extending in the rightward and leftward direction may be provided as an event detector, and detect the pitching angular velocity of the pitching motion of the vehicle body 10. When the detected pitching angular velocity is a predetermined value, the controller 8 may determine that a preceding event has occurred, which precedes the set event in which the vehicle body 10 is banked at a predetermined bank angle and is a change in the posture of the vehicle body 10 which is going to just enter the curve or the intersection.

Alternatively, an event in which a direction indicator is turned on may be detected as the event occurring in the vehicle being traveling, and the lighting operations of the auxiliary lamps 6 may be controlled based on this event. For example, when the motorcycle 1 is going to just enter the intersection, the rider turns on the direction indicator to allow a person located in the vicinity of the motorcycle 1 to know the turning direction. In a specific configuration, a sensor which is an event detecting section for detecting whether or not the direction indicator is ON may be provided. When the sensor detects that the direction indicator is ON, the controller 8 may determine that a preceding event which occurs before the vehicle body 10 reaches a set event in which the vehicle body 10 is banked at a predetermined bank angle has occurred.

Although in the above-described embodiments, the auxiliary lamps 6a to 6c disposed on the first side in the vehicle width direction relative to the head lamp 5 are lighted when the vehicle body 10 is banked to the first side in the vehicle width direction, the auxiliary lamps 6d to 6f disposed on the second side in the vehicle width direction relative to the head lamp 5 may be lighted. Although in the above-described embodiments, the luminosity of the light emitted from each of the auxiliary lamps 6a to 6f is adjusted to form the preceding lighting state and the set lighting state, this is merely exemplary. For example, the auxiliary lamp 6 which is lighted in the preceding lighting state and the auxiliary lamp 6 which is lighted in the set lighting state may be provided separately.

The order in which the auxiliary lamps 6a to 6c are lighted is not limited to the above-described embodiments and may be changed so long as the auxiliary lamp irradiation region 60 is irradiated to irradiate a front region in the traveling direction with the light (beam) emitted from each of the auxiliary lamps 6a to 6c. Although in the above-described embodiments, in the set lighting states L1, L2, L3 of each of the auxiliary lamps 6a to 6c, the brightness of the light emitted from the auxiliary lamps 6a to 6c is increased in a straight-line in proportion to the bank angle of the vehicle body 10, it may be increased linearly in proportion to the bank angle of the vehicle body 10. Further, in the set lighting states L1, L2, L3 each of the auxiliary lamps 6a to 6c, the luminosity of the light emitted from the auxiliary lamps 6a to 6c may be increased in a stepwise manner or in a curve line shape, in proportion of the bank angle.

Each of the auxiliary lamps 6 may be lighted to irradiate the road surface of the region to which the motorcycle 1 turns in such a manner that a lens of the auxiliary lamp 6 is rotated by an angle corresponding to the magnitude of the bank angle of the vehicle body 10. In a case where a screen is placed in a direction perpendicular to the forward and rearward direction of the vehicle body 10, in front of the head lamp 5, and the head lamp 5 and the auxiliary lamps 6 emit the light to the screen, a positional relationship between a head lamp irradiation region and auxiliary lamp irradiation regions which is set on the screen in a state in which the vehicle body 10 is banked is similar to a positional relationship between the head lamp irradiation region 50 and the auxiliary lamp irradiation regions 60 which is set on the road surface 15 in a state in which the vehicle body 10 is banked. Further, one auxiliary lamp 6 may be disposed on the first side in the vehicle width direction relative to the head lamp 5. Moreover, the auxiliary lamps 6a to 6f may have different structures, instead of the same structure.

Although in the above-described embodiments, the motorcycle 1 has been specifically described as the vehicle, this is merely exemplary. For example, the present invention is applicable to other vehicles such as a three-wheeled vehicle or a four-wheeled vehicle (e.g., all-terrain vehicle), or a ship such as a personal watercraft so long as a body is banked while the vehicle is traveling. For example, in a case where the vehicle is the four-wheeled vehicle, the lighting operations of the auxiliary lamps may be controlled based on a yawing angular velocity or a yawing angle around an axis (yawing axis) of the vehicle body extending in a vertical direction.

The invention claimed is:

1. A vehicle which turns in a state in which a vehicle body is banked from an upright state to a first side in a vehicle width direction of the vehicle body, the vehicle comprising:
    a head lamp which is attached to the vehicle body, and irradiates a head lamp irradiation region set in front of the vehicle body;
    an auxiliary lamp which is attached to the vehicle body, and irradiates an auxiliary lamp irradiation region set in front of the head lamp irradiation region, on the first side in the vehicle width direction;
    a bank state detecting section which detects a bank state of the vehicle body; and
    a lighting control section which lights the auxiliary lamp depending on the bank state of the vehicle body,
    wherein the lighting control section causes the auxiliary lamp to be lighted in a predetermined set lighting state at predetermined luminosity, when the bank state detecting section detects a predetermined set bank state of the vehicle body,
    wherein the lighting control section causes the auxiliary lamp to be lighted in a predetermined preceding lighting state at predetermined luminosity lower than the predetermined luminosity of the predetermined set lighting state, when the bank state detecting section detects a predetermined preceding bank state of the vehicle body which occurs before the vehicle body reaches the predetermined set bank state,
    wherein the lighting control section controls the auxiliary lamp to be turned off from when the upright state is detected until the preceding bank state is detected,
    wherein the lighting control section lights the auxiliary lamp in such a manner that the luminosity of the light emitted from the auxiliary lamp is constant in a specified range for a time period from when the predetermined preceding bank state is detected until the predetermined set bank state is detected, and
    wherein the lighting control section controls the luminosity of the light emitted from the auxiliary lamp in such a manner that the luminosity is increased as a degree of a bank angle of the vehicle body is increased after the predetermined set bank state is detected.

2. The vehicle according to claim 1,
    wherein at least a portion of the auxiliary lamp irradiation region formed in a case where the vehicle body is in the predetermined preceding bank state is an auxiliary lamp preceding irradiation region located in front of a cut-off line of the head lamp irradiation region of the head lamp in a case where the vehicle body is in the upright state, and
    wherein the lighting control section controls luminosity of the light emitted from the auxiliary lamp used to irradiate the auxiliary lamp irradiation region in such a manner that the luminosity is set to be lower when the vehicle body is in the predetermined preceding bank state than when the vehicle body is in the predetermined set bank state.

3. The vehicle according to claim 1,
    wherein at least a portion of the auxiliary lamp irradiation region formed in a case where the vehicle body is in the predetermined preceding bank state is located in front of a cut-off line of the head lamp irradiation region of the head lamp in a case where the vehicle body is in the upright state, and wherein the auxiliary lamp irradiation region formed in a case where the vehicle body is in the predetermined set bank state is located rearward relative to the cut-off line of the head lamp irradiation region of the head lamp in a case where the vehicle body is in the upright state.

4. The vehicle according to claim 1,
wherein a degree of the bank angle of the vehicle body in a case where the auxiliary lamp is lighted after the bank state detecting section detects that the vehicle body has reached the predetermined preceding bank state is larger than a degree of the bank angle in a case where the auxiliary lamp is turned off after the bank state detecting section detects that the vehicle body has exited the predetermined preceding bank state.

5. The vehicle according to claim 1,
wherein the predetermined set bank state includes a first set bank state and a second set bank state having a bank angle larger than that of the first set bank state,
wherein the predetermined preceding bank state includes a first preceding bank state having a bank angle smaller than that of the first set bank state, and a second preceding bank state having a bank angle smaller than that of the second set bank state,
wherein the auxiliary lamp includes a first auxiliary lamp which irradiates a first auxiliary lamp irradiation region set in front of the head lamp irradiation region, and a second auxiliary lamp which irradiates a second auxiliary lamp irradiation region set in front of the first auxiliary lamp irradiation region,
wherein the lighting control section causes the first auxiliary lamp to be lighted in a first set lighting state at predetermined luminosity of the light, when the bank state detecting section detects that the vehicle body has reached the first set bank state,
wherein the lighting control section causes the second auxiliary lamp to be lighted in a second set lighting state at predetermined luminosity of the light, when the bank state detecting section detects that the vehicle body has reached the second set bank state, and
wherein the lighting control section causes the second auxiliary lamp to be lighted in a second preceding lighting state at predetermined luminosity of the light which is lower than that of the second set lighting state, when the bank state detecting section detects the second preceding bank state of the vehicle body after the lighting control section caused the first auxiliary lamp to be lighted in the first set lighting state.

6. The vehicle according to claim 1,
wherein luminosity of the light emitted from the auxiliary lamp when the vehicle body is in the predetermined preceding bank state is set to a value which is lower than 1000 cd, to prevent a situation in which a person riding in another vehicle is bothered by glaring light emitted from the auxiliary lamp.

7. The vehicle according to claim 1,
wherein luminosity of the light emitted from the auxiliary lamp when the vehicle body is in the predetermined preceding bank state is set to a value of 300 cd or higher.

8. A vehicle which turns in a state in which a vehicle body is banked from an upright state to a first side in a vehicle width direction of the vehicle body, the vehicle comprising:
a head lamp which is attached to the vehicle body, and irradiates a head lamp irradiation region set in front of the vehicle body;
an auxiliary lamp which is attached to the vehicle body, and irradiates an auxiliary lamp irradiation region set in front of the head lamp irradiation region, on the first side in the vehicle width direction;
an event detecting section which detects an event which occurs in the vehicle while the vehicle is traveling; and
a lighting control section which lights the auxiliary lamp depending on the event of the vehicle,
wherein the lighting control section causes the auxiliary lamp to be lighted in a predetermined set lighting state at predetermined luminosity, when the event detecting section detects a predetermined set event of the vehicle,
wherein the lighting control section causes the auxiliary lamp to be lighted in a predetermined preceding lighting state at predetermined luminosity lower than that of the predetermined set lighting state, when the event detecting section detects a preceding event of the vehicle which occurs before the predetermined set event of the vehicle,
wherein the lighting control section controls the auxiliary lamp to be turned off from when the upright state is detected until a preceding bank state is detected,
wherein the lighting control section lights the auxiliary lamp in such a manner that the luminosity of the light emitted from the auxiliary lamp is constant in a specified range for a time period from when the preceding event is detected until the predetermined set event is detected, and
wherein the lighting control section controls the luminosity of the light emitted from the auxiliary lamp in such a manner that the luminosity is increased as a degree of a bank angle of the vehicle body is increased after the predetermined set event is detected.

* * * * *